US006459261B1

(12) United States Patent
Luetzow et al.

(10) Patent No.: US 6,459,261 B1
(45) **Date of Patent: *Oct. 1, 2002**

(54) MAGNETIC INCREMENTAL MOTION DETECTION SYSTEM AND METHOD

(75) Inventors: Robert Herman Luetzow, Lytle, CA (US); Kenneth Brown, Banning, CA (US)

(73) Assignee: Wabash Technologies, Inc., Huntington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,647

(22) Filed: Oct. 6, 1999

Related U.S. Application Data

(63) Continuation-in-part of application No. 09/353,852, filed on Jul. 5, 1999, now Pat. No. 6,356,076.

(51) Int. Cl.[7] .................... G01B 7/30; H01L 43/08

(52) U.S. Cl. .................... 324/207.21; 324/207.25

(58) Field of Search .................... 324/207.21, 207.22, 324/173, 174, 207.25, 235, 252, 233; 338/32 R; 341/15; 340/672

(56) References Cited

U.S. PATENT DOCUMENTS 3,729,728 A 4/1973 Hardway, Jr. ............... 340/200
3,863,235 A * 1/1975 McKee et al. ......... 324/207.25
4,058,705 A 11/1977 Cannon ...................... 235/449
4,339,727 A 7/1982 Kage et al. ................. 329/106
4,914,387 A 4/1990 Santos ........................ 324/166
4,970,463 A 11/1990 Wolf et al. .............. 324/207.2
5,166,611 A 11/1992 Kujawa, Jr. et al. ........ 324/166
5,430,373 A 7/1995 Ichikawa et al. ...... 324/207.21
5,444,369 A 8/1995 Luetzow .................. 324/207.2
5,493,219 A 2/1996 Makino et al. ........ 324/207.25
5,570,052 A 10/1996 Fonderie et al. ............ 327/205
5,612,618 A 3/1997 Arakawa ............... 324/207.25
5,650,719 A 7/1997 Moody et al. .............. 324/166
5,663,641 A 9/1997 Morita ........................ 324/174
5,696,442 A 12/1997 Foster et al. ................ 324/173
5,719,496 A 2/1998 Wolf .......................... 324/165
5,747,987 A 5/1998 Smith .................... 324/207.13
5,754,042 A * 5/1998 Schroeder et al. ..... 324/207.25
5,757,180 A 5/1998 Chou et al. .............. 324/207.2
5,821,745 A 10/1998 Makino et al. ........ 324/207.25
5,952,824 A 9/1999 Shinjo et al. .......... 324/207.21
6,211,670 B1 4/2001 DeWilde et al. ....... 324/207.21

OTHER PUBLICATIONS

Allegro Advance Information Data Sheet, ATS612LSB, Dynamic, Self–Calibrating, Peak–Detecting, Differential Hall–Effect Gear–Tooth Sensor, 16 pages, Sep. 16, 1996.

* cited by examiner

*Primary Examiner*—Walter E. Snow
(74) *Attorney, Agent, or Firm*—Woodard, Emhardt, Naughton Moriarty & McNett

(57) ABSTRACT

A magnetic incremental motion detection system for outputting a plurality of voltage and/or current signals in digital form wherein the voltage and/or current signals are a collective representation of any incremental rotational, linear, or pivotal movement of an object. A target of the system is adjoined to an object to synchronously move with the object. A plurality of indications are adjoined to the target, and uniformly and serially disposed along an area of a surface of the target. The system further comprises one or more magnetic sensing devices spatially positioned from the area of the surface to define air gap areas therebetween. Each of the magnetic sensing devices are operable to output a digital signal in response to a synchronous movement of the target with the object. The outputted digital signals have the same duty cycle, and are consistently out of phase with each other by the same degree.

26 Claims, 14 Drawing Sheets

120
121d 121d 121d 121d 121d 121d 121d 121d 121d
121c 121c 121c 121c 121c 121c 121c 121c
$A_1$ 81a 81b $A_1$ 83 84
$A_2$ 181a 181b $A_2$ 183 184

MAGNETIC INCREMENTAL MOTION DETECTION SYSTEM AND METHOD

CROSS-REFERENCE TO RELATED APPLICATION

This application is a continuation-in-part of application Ser. No. 09/353,852, filed Jul. 15, 1999, now U.S. Pat. No. 6,356,076, entitled, "System for Outputting a Plurality of Signals as a Collective Representation of Incremental Movements of an Object."

BACKGROUND OF THE INVENTION

1. Field of the Invention

The present invention relates generally to magnetic sensing systems, and more specifically, to a magnetic sensing system for outputting a plurality of voltage or current signals in digital form as a collective representation of any incremental rotational, linear, or pivotal movement of an object.

2. Background

Magnetic sensors known in the art are operable to output an analog signal as a function of the magnetic flux density of any magnetic flux passing through one or more magnetic flux sensitive transducers of the magnetic sensor, e.g. a magneto-resistor, a Hall effect element, a coil, etc. The magnetic sensor is spatially positioned from an object to define an air gap area therebetween. A portion of a magnetic field traverses the air gap area, and the magnetic flux sensitive transducer(s) is (are) disposed within the magnetic field. As a result, the magnitude of the analog signal varies in response to any rotational movement, any linear movement, and/or any pivotal movement of the object that increases or decreases the reluctance across the air gap area to thereby alter the magnetic flux density of the magnetic flux passing through the magnetic flux sensitive transducer (s). Consequently, whenever any cyclical movement of the object undulates any magnetic flux passing through the magnetic flux sensitive transducer(s), each incremental movement of the object away from a reference position of the object is represented by a particular magnitude of the analog signal. Accordingly, the analog signal of a magnetic sensor has been and will continue to be extensively utilized by various electromechanical systems to ascertain a present position of the object relative to a reference position of the object.

Particularly, magnetic rotational position sensors have been extensively incorporated in engine timing systems of motor vehicles to ascertain the present rotational position of a rotary shaft relative to a reference position of the rotary shaft. Typically, the magnitude level of the analog signal is representative of a present rotational position of the rotary shaft relative to a reference position of the rotary shaft. For example, a magnitude of zero (0) volts can represent a closed position of the shaft. a magnitude of five (5) volts can represent a completely opened position of the rotary shaft that is a ninety (90) degree range of rotation from the closed position, and each magnitude of the analog signal between zero (0) volts and five (5) volts is linearly representative of a particular degree of rotation of the rotary shaft from the closed position. A computer of the motor vehicle therefore includes some form of "lookup" table to ascertain the present rotational position of the rotary shaft relative to the closed position as a function of the magnitude of the analog signal. Thus, if the computer receives the analog signal with a magnitude of 2.5 volts, the computer can ascertain that the rotary shaft is forty-five (45) degrees from the closed position based on the lookup table.

However, in some cases, it is desired to ascertain a degree of a rotational movement of a rotary shaft between two rotational positions, and in such cases, the present magnitude of the analog signal is not a representation of the degree of rotational movement of a rotary shaft between the two rotational positions. In order to ascertain the degree of rotational movement of the rotary shaft between the two rotational positions, the computer would have to be programmed to: (1) ascertain the initial rotational position of the rotary shaft relative to the reference position of the rotary shaft; (2) ascertain the present rotational position of the rotary shaft relative to the reference position of the rotary shaft; (3) determine the difference between the magnitude of the analog signal when the rotary shaft was at its initial rotational position and the present magnitude of the analog signal; and (4) ascertain the degree of movement as a function of the differences in the magnitudes. It is clear that this would require ample memory space and an appropriate clock signal to allow each of the calculations to be completed in a timely manner. However, the memory space may not be available, and/or the clock signal may be running at a frequency that will not enable the completions of the calculations in a timely manner. What is therefore needed is a system for ascertaining a degree of rotational, linear, or pivotal movement of an object between two positions.

SUMMARY OF THE INVENTION

The present invention overcomes the aforementioned drawback(s) associated with magnetic position sensors in ascertaining a degree of movement of an object. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

The present invention is a magnetic incremental motion detection system for outputting a plurality of voltage and/or current signals in digital form wherein the voltage and/or current signals are a collective representation of any incremental rotational, linear, or pivotal movement of an object. A target of the system is adjoined to an object to synchronously move with the object. A plurality of indications are adjoined to the target, and uniformly and serially disposed along an area of a surface of the target.

In a first aspect of the present invention, a pair of magnetic sensing devices of the system are spatially positioned from the area of the surface to define air gap area(s) therebetween. Each magnetic sensing device includes a magnetic sensor and a digital circuit having a signal amplification stage and a signal comparison stage. Each magnetic sensing device is operable to output a digital signal in response to a synchronous movement of the target with the object. The outputted digital signals have identical duty cycles, and are consistently out of phase with each other by the same degree.

In a second aspect of the present invention, a magnetic sensing device of the system is spatially positioned from the area of the surface to define an air gap area therebetween. The magnetic sensing device includes a magnetic sensor and pair of digital circuits each having a signal amplification stage and a signal comparison stage. The magnetic sensing device is operable to output a pair of digital signals in response to a synchronous movement of the target with the object. The outputted digital signals have identical duty cycles, and are consistently out of phase with each other by the same degree.

It is a primary objective of the present invention to sense each incremental rotational, linear, or pivotal movement of an object.

It is also a primary objective of the present invention to a plurality of voltage or current signals in digital form as a collective representation of each sensed incremental rotational, linear, or pivotal movement of an object.

Secondary objectives as well as advantages of the present invention will be apparent from the following description of the present invention and various embodiments thereof.

DESCRIPTION OF THE PREFERRED EMBODIMENT

Figure 1A:
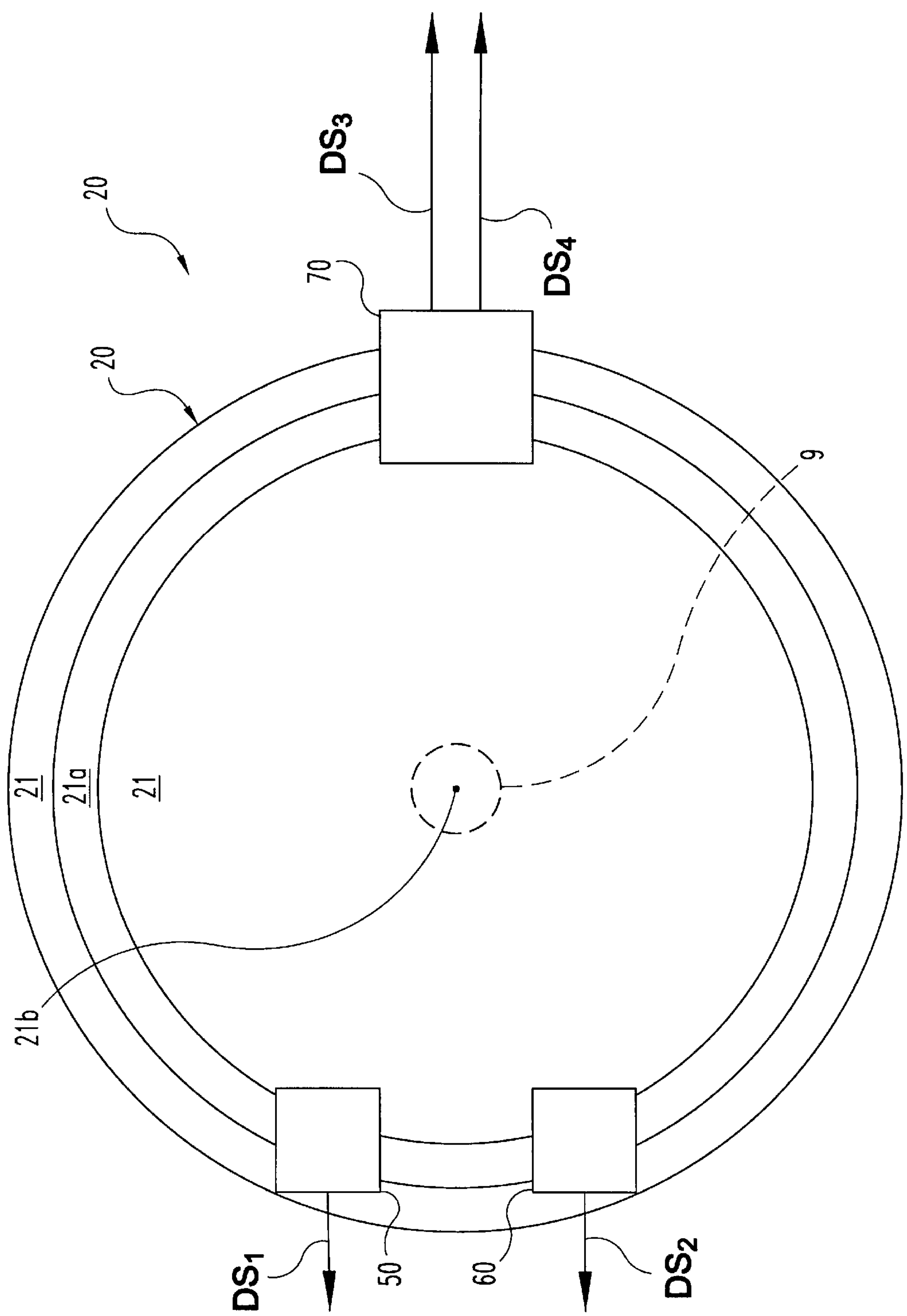
FIG. 1A is a top plan view of a magnetic incremental rotational motion detection system for incrementally detecting a rotational movement of an object in accordance with the present invention.

For the purposes of promoting an understanding of the principles of the present invention, reference will now be made to various embodiments of the present invention, particularly the preferred embodiment, as illustrated in the drawings and specific language will be used to describe the same. It will nevertheless be understood that no limitation of the scope of the claims of the present invention is thereby intended. Any alterations and further modifications in the illustrated embodiments, and any further applications of the principles of the present invention as illustrated herein are contemplated as would normally occur to one skilled in the art to which the present invention relates.

The present invention is a magnetic incremental motion detection system for outputting a plurality of voltage and/or current signals in digital form wherein the voltage and/or current signals are a collective representation of any incremental rotational, linear, or pivotal movement of an object. The present invention contemplates that the object may be magnetic or ferromagnetic. The present invention further contemplates that the object can have any geometric configuration and any physical dimensions.

Referring to FIG. 1A, a magnetic incremental rotational motion detection system 10 in accordance with the present invention is shown. Magnetic incremental rotational motion detection system 10 outputs a plurality of voltage and/or current signals in digital form wherein the voltage and/or current signals are a collective representation of an incremental rotation of an object. Each embodiment of magnetic incremental rotational motion detection system 10 comprises a target 20. For purposes of the present invention, target 20 is defined as an article of manufacture or a combination of manufactured articles having a substantially planar surface 21 with a plurality of indications adjoined to surface 21 and serially disposed along an annular area 21*a* of surface 21; and an indication is defined as a hole, an indentation like a slot, a protrusion like a tooth, or an article of manufacture or combination of manufactured articles like a pole piece or a magnet. For purposes of the present invention, the adjoining of an indication to a target, e.g. target 20, is defined as an unitary fabrication, a permanent affixation, a detachable coupling, an engagement, and/or a contiguous disposal of the indication to the target by any manufacturing method.

The present invention contemplates that target 20 can be magnetic or ferromagnetic, and that indications are either magnetic or ferromagnetic. The present invention further contemplates that target 20 and the indications adjoined to surface 21 can have any geometric configuration and any physical dimensions, and that the annular area 21*a* can occupy any radial positions from a center 21*b* of surface 21. Consequently, a preferential reference of target 20 and indications adjoined to surface 21 as subsequently described herein is given solely for purposes of describing the best mode of the present invention and is not meant to be limiting to the scope of the claims in any way.

An embodiment of a magnetic incremental rotational motion detection system 10 can further comprise a magnetic sensing device 50 being operable to output a digital signal $DS_1$ as shown and a magnetic sensing device 60 being operable to output a digital signal $DS_2$ as shown, and/or a magnetic sensing device 70 being operable to output a digital signal $DS_3$ and a digital signal $DS_4$ as shown. For purposes of the present invention, a magnetic sensor is defined as any article of manufacture or any combination of manufactured articles including at least one magnetic flux sensitive transducer of any type being operable to output an analog signal as a function of the magnetic flux density of any magnetic flux passing through the magnetic flux sensitive transducer(s); a digital circuit is defined as any article of manufacture or any combination of manufactured articles including a signal amplification stage and a signal comparison stage that are collectively operable to input an analog signal and to output a digital signal as a representation of a property of the inputted analog signal, e.g. zero crossover occurrences, peak amplitude occurrences, etc.; magnetic sensing device 50 and magnetic sensing device 60 are defined as any combination of manufactured articles including at least a magnetic sensor and a digital circuit electrically coupled to the magnetic sensor to thereby input the analog signal from the magnetic sensor; and magnetic sensing device 70 is defined as any combination of manufactured articles including at least a pair of magnetic sensors, a first digital circuit electrically coupled to the first magnetic sensor to thereby input the analog signal from the first magnetic sensor, and a second digital circuit electrically coupled to the second magnetic sensor to thereby input the analog signal from the second magnetic sensor. In addition to the magnetic flux sensitive transducer(s), the present invention contemplates that a magnetic sensor may further comprise one or more pole pieces, and/or one or more magnets. Consequently, a preferential reference of a magnetic sensor as subsequently described herein is given solely for purposes of describing the best mode of the present invention and is not meant to be limiting to the scope of the claims in any way. In addition, a preferential reference of a digital circuit as subsequently described herein is given solely for purposes of describing the best mode of the present invention and is not meant to be limiting to the scope of the claims in any way.

Figure 2A:
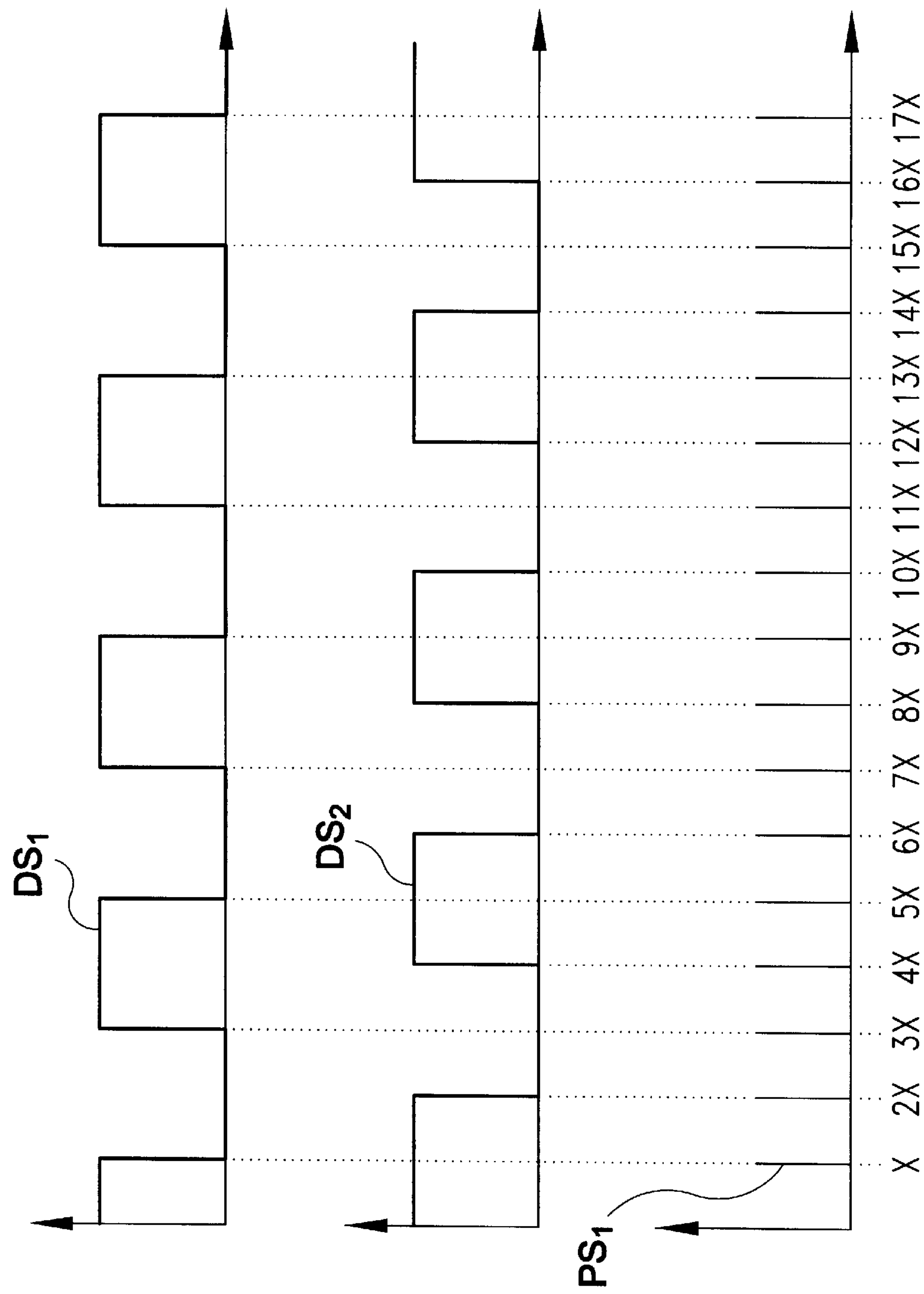
FIG. 2A is set of graphical waveforms of a pair of digital signals from either of the magnetic incremental motion detection systems of FIGS. 1A–1C, and a graphical waveform of a pulse signal as a function of the pair of digital signals.

Referring to FIGS. 1A and 2A, an example of an incremental rotational motion detection of a rotary shaft 9 by an utilization of target 20, magnetic sensing device 50, and magnetic sensing device 60 will now be described herein. Rotary shaft 9 rotates about its longitudinal axis, and target 20 is adjoined to rotary shaft 9 with the longitudinal axis of rotary shaft 9 perpendicularly intersecting center 21*b* whereby target 20 synchronously rotates with rotary shaft 9 about is longitudinal axis. For purposes of the present invention, an adjoining of target 20 to an object like rotary shaft 9 is broadly defined as an unitary fabrication, a permanent affixation, a detachable coupling, an engagement, and/or a contiguous disposal of target 20 to the object. Each magnetic flux sensitive transducer of magnetic sensing device 50 are spatially positioned from annular area 21*a* to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 20, and/or a magnet or magnets of magnetic sensing device 50, if any. Each magnetic flux sensitive transducer of magnetic sensing device 60 are spatially positioned from annular area 21*a* to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 20, and/or a magnet or magnets of magnetic sensing device 60, if any. Consequently, any synchronous rotational movement of target 20 with rotary shaft 9 will increase or decrease the reluctance across the air gaps to thereby alter the density of the magnetic flux flowing through the magnetic flux sensitive transducer(s) of both magnetic sensing device 50 and magnetic sensing device 60. To output digital signal $DS_1$ and digital signal $DS_2$ as individual representations of any synchronous rotational movement of target 20, the magnetic flux sensitive transducer(s) of magnetic sensing device 50 and magnetic sensing device 60 must be spatially positioned relative to each other whereby a magnetic flux line of the magnetic field(s) can not simultaneously intersect two magnetic flux sensitive transducer(s).

For digital signals $DS_1$ and $DS_2$ to collectively represent incremental rotational movements of rotary shaft 9, two principles of the present invention must be followed. First, the present invention contemplates that the incremental rotational movements of rotary shaft 9 can be detected in any multiples, e.g. every degree, every three (3) degrees, every ten (10) degrees, every one-tenth (1/10) of a degree, etc. Accordingly, the number of indications as well as the geometric configuration and physical dimensions of the indications must be selected whereby a common width of each indication and a common distance between indications are both a function of the desired multiple of degrees to be detected. This principle will be further illustrated in connection with FIG. 3A and described in the accompanying text. Second, the magnetic flux sensitive transducer(s) of magnetic sensing device 50 and magnetic sensing device 60 must be positioned relative to the indications and to each other whereby digital signal $DS_1$ and digital signal $DS_2$ have the same duty cycle, e.g. a 50% duty cycle as shown in FIG. 2A, and digital signal $DS_1$ and digital signal $DS_2$ are consistently out of phase by the same degree, e.g. ninety (90) degrees out of phase as shown in FIG. 2A.

A pulse waveform $PS_1$ is shown as a function of each rising edge and falling edge of digital signal $DS_1$ and digital signal $DS_2$. By adhering to the aforementioned principles, each rising edge and falling edge of digital signal $DS_1$ and digital signal $DS_2$ represents a desired multiple X of degrees to be detected, and therefore, each pulse of pulse waveform $PS_1$ is generated upon each incremental rotation of rotary shaft 9 as a function of the desired multiple X of degrees to be detected. Consequently, a computer can monitor each rising edge and falling edge of digital signal $DS_1$ and digital signal $DS_2$ to thereby ascertain each incremental rotational degree of movement of rotary shaft 9, and/or a pulse waveform like pulse waveform $PS_1$ can be inputted into an electronic device like a counter whereby the total number of incremental rotations can be ascertained. For embodiments of magnetic incremental rotational motion detection system 10 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous rotational movement of target 20, digital signal $DS_3$ and digital signal $DS_4$ have the same duty cycle, and digital signal $DS_3$ and digital signal $DS_4$ are consistently out of phase by the same degree.

Figure 1B:
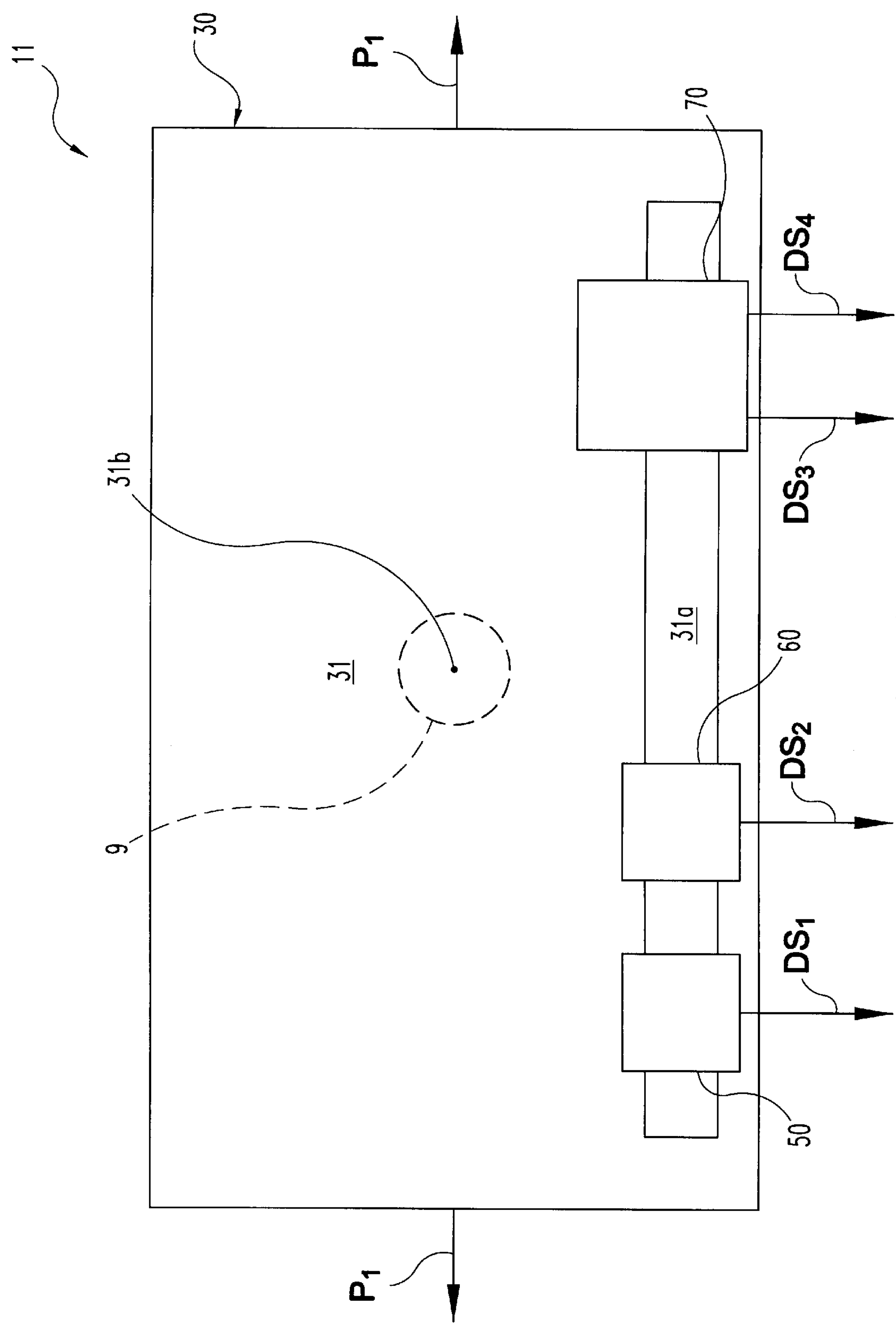
FIG. 1B is a top plan view of a magnetic incremental linear motion detection system for incrementally detecting a linear movement of an object in accordance with the present invention.

Referring to FIG. 1B, a magnetic incremental linear motion detection system 11 in accordance with the present invention is shown. Magnetic incremental linear motion detection system 11 outputs a plurality of voltage and/or current signals in digital form wherein the voltage and/or current signals are a collective representation of an incremental linear displacement of an object. Each embodiment of magnetic incremental linear motion detection system 11 comprises a target 30. For purposes of the present invention, target 30 is defined as an article of manufacture or a combination of manufactured articles having a substantially planar surface 31 with a plurality of indications adjoined to surface 31 and serially disposed along a rectangular area 31*a* of surface 31. The present invention contemplates that target 30 can be magnetic or ferromagnetic. The present invention further contemplates that target 30 can have any geometric configuration and any physical dimensions, and that the linear region 31*a* can occupy any location on target surface 31. An embodiment of magnetic incremental linear motion detection system 11 can further comprise magnetic sensing device 50 as previously illustrated herein in connection with FIG. 1A and described in accompanying text, magnetic sensing device 60 as previously illustrated herein in connection with FIG. 1A and described in accompanying text, and/or magnetic sensing device 70 as previously illustrated herein in connection with FIG. 1A and described in accompanying text.

Referring to FIGS. 1B and 2A, an example of an incremental linear motion detection of a rotary shaft 9 by an utilization of target 30, magnetic sensing device 50, and magnetic sensing device 60 will now be described herein. Rotary shaft 9 is linearly displaced along a path $P_1$, and target 30 is adjoined to rotary shaft 9 with the longitudinal axis of rotary shaft 9 perpendicularly intersecting a center 31*b* of surface 31 to thereby synchronously linearly displace target 30 with rotary shaft 9 along path $P_1$. For purposes of the present invention, an adjoining of target 30 to an object like rotary shaft 9 is defined as an unitary fabrication, a permanent affixation, a detachable coupling, an engagement, and/or a contiguous disposal of target 30 to the object. Each magnetic flux sensitive transducer of magnetic sensing device 50 are spatially positioned from rectangular area 31*a* to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 30, and/or a magnet or magnets of magnetic sensing device 50, if any. Each magnetic flux sensitive transducer of magnetic sensing device 60 are spatially positioned from rectangular area 31*a* to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 30, and/or a magnet or magnets of magnetic sensing device 60, if any. Consequently, any synchronous linear displacement of target 30 with rotary shaft 9 will increase or decrease the reluctance across the air gaps to thereby alter the density of the magnetic flux flowing through the magnetic flux sensitive transducer(s) of magnetic sensing device 50 and magnetic sensing device 60. To output digital signal $DS_1$ and digital signal $DS_2$ as individual representations of any synchronous linear displacement of target 30, the magnetic flux sensitive transducer(s) of both magnetic sensing device 50 and magnetic sensing device 60 must be spatially positioned relative to each other whereby a magnetic flux line of the magnetic field(s) can not simultaneously intersect two magnetic flux sensitive transducer(s).

The present invention contemplates that the incremental linear displacements of rotary shaft 9 can be detected in any multiples, e.g. every inch, every three (3) centimeters, every ten (10) millimeters, every one-tenth (1/10) of a inch, etc. Accordingly, the number of indications as well as the geometric configuration and physical dimensions of the indications must be selected whereby a common width of each indication and a common distance between indications are both a function of the desired multiple of length to be detected. In addition, the magnetic flux sensitive transducers of magnetic sensing device 50 and magnetic sensing device 60 are positioned relative to the indications and to each other whereby digital signal $DS_1$ and digital signal $DS_2$ have a 50% duty cycle, and digital signal $DS_2$ is consistently ninety (90) degrees out of phase with digital signal $DS_1$.

Each rising edge and falling edge of digital signal $DS_1$ and digital signal $DS_2$ represents a desired multiple X of length to be detected, and therefore, each pule of pulse waveform $PS_1$ is generated upon each incremental linear displacement of rotary shaft 9 as a function of the desired multiple X of degrees to be detected. Consequently, a computer can monitor each rising edge and falling edge of digital signal $DS_1$ and digital signal $DS_2$ to thereby ascertain each incremental linear displacement of rotary shaft 9, and/or a pulse waveform like pulse waveform $PS_1$ can be inputted into an electronic device like a counter whereby the total number of incremental linear displacements can be ascertained. For embodiments of magnetic incremental linear motion detection system 11 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous linear displacement of target 30, digital signal $DS_3$ and digital signal $DS_4$ have the same duty cycle, and digital signal $DS_3$ and digital signal $DS_4$ are consistently out of phase by the same degree.

Figure 1C:
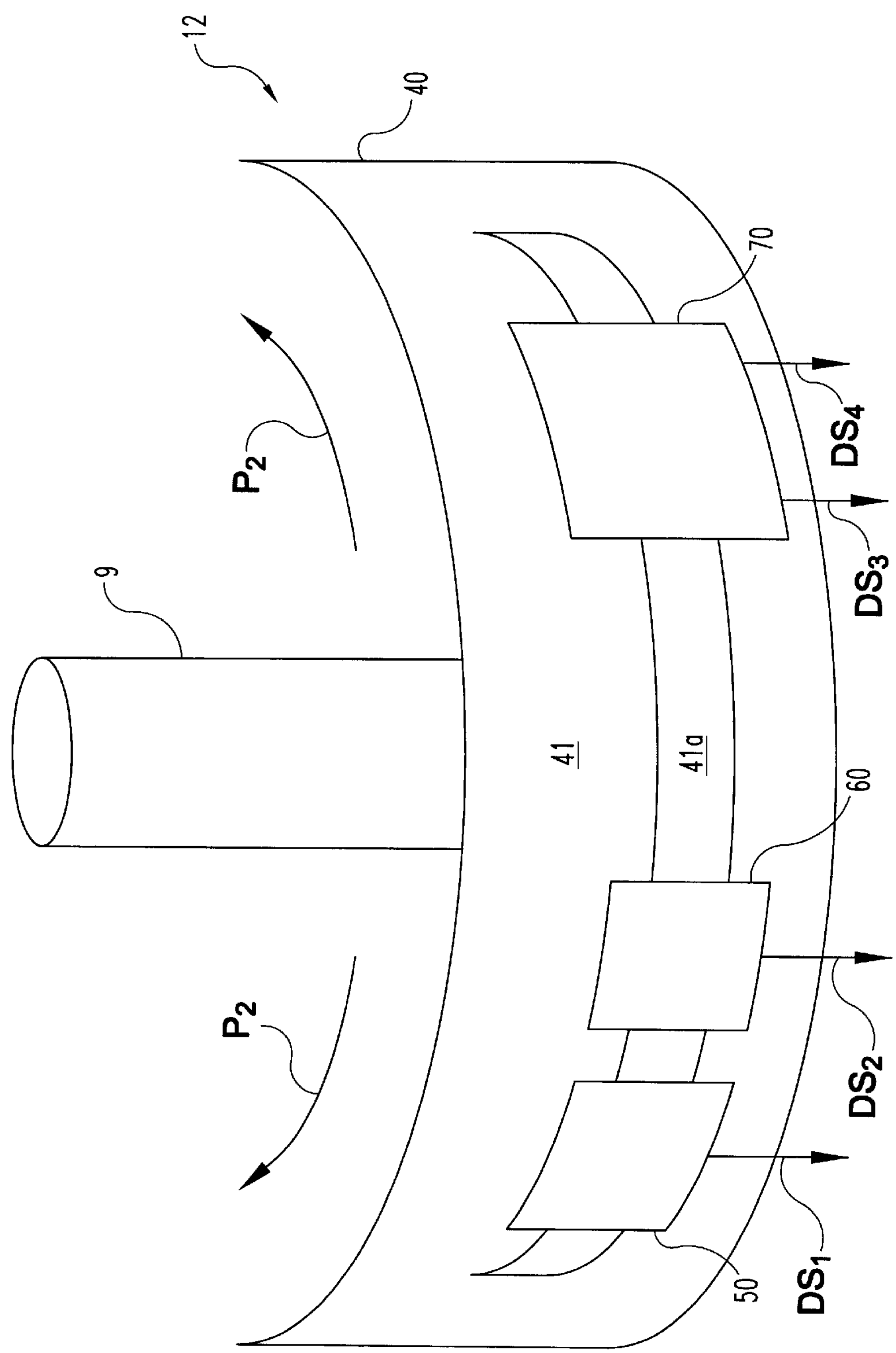
FIG. 1C is a top plan view of a magnetic incremental pivotal motion detection system for incrementally detecting a pivotal movement of an object in accordance with the present invention.

Referring to FIG. 1C, a magnetic incremental pivotal motion detection system 12 in accordance with the present invention is shown. Magnetic incremental pivotal motion detection system 12 outputs a plurality of voltage and/or current signals in digital form wherein the voltage and/or current signals are a collective representation of an incremental pivotal displacements of an object. Each embodiment of magnetic incremental pivotal motion detection system 12 comprises a target 40. For purposes of the present invention, target 40 is defined as an article of manufacture or a combination of manufactured articles having a substantially planar surface 41 with a plurality of indications adjoined to surface 41 and serially disposed along an arcuate area 41*a* of surface 41. The present invention contemplates that target 40 can be magnetic or ferromagnetic. The present invention further contemplates that target 40 can have any geometric configuration and any physical dimensions, and that arcuate area 41*a* can occupy any location on target surface 41. An embodiment of magnetic incremental pivotal motion detection system 12 can further comprise magnetic sensing device 50 as previously illustrated herein in connection with FIG. 1A and described in accompanying text, magnetic sensing device 60 as previously illustrated herein in connection with FIG. 1A and described in accompanying text, and/or magnetic sensing device 70 as previously illustrated herein in connection with FIG. 1A and described in accompanying text.

Referring to FIGS. 1C and 2A, an example of an incremental pivotal motion detection of a rotary shaft 9 by an utilization of target 40, magnetic sensing device 50, and magnetic sensing device 60 will now be described herein. Rotary shaft 9 is pivotally displaced along a path $P_2$, and target 40 is adjoined to rotary shaft 9 with the longitudinal axis of rotary shaft 9 perpendicularly intersecting a side surface (not shown) of target 40 to thereby synchronously pivotally displace target 40 with rotary shaft 9 along path $P_2$. For purposes of the present invention, an adjoining of target 40 to an object like rotary shaft 9 is defined as an unitary fabrication, a permanent affixation, a detachable coupling, an engagement, and/or a contiguous disposal of target 40 to object. Each magnetic flux sensitive transducer of magnetic sensing device 50 are spatially positioned from arcuate area 41*a* to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 40, and/or a magnet or magnets of magnetic sensing device 50, if any. Each magnetic flux sensitive transducer of magnetic sensing device 60 are spatially positioned from arcuate area 41*a* to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 40, and/or a magnet or magnets of magnetic sensing device 60, if any. Consequently, any synchronous pivotal displacement of target 40 with rotary shaft 9 will increase or decrease the reluctance across the air gaps to thereby alter the density of the magnetic flux flowing through the magnetic flux sensitive transducer(s) of magnetic sensing device 50 and magnetic sensing device 60. To output digital signal $DS_1$ and digital signal $DS_2$ as individual representations of any synchronous pivotal displacement of target 40, the magnetic flux sensitive transducer(s) of both magnetic sensing device 50 and magnetic sensing device 60 must be spatially positioned relative to each other whereby a magnetic flux line of the magnetic field(s) can not simultaneously intersect two magnetic flux sensitive transducer(s).

The present invention contemplates that the incremental pivotal displacements of rotary shaft 9 can be detected in any multiples, e.g. every degree, every three (3) degrees, every ten (10) degrees, every one-tenth (1/10) of a degrees, etc. Accordingly, the number of indications as well as the geometric configuration and physical dimensions of the indications must be selected whereby a common width of each indication and a common distance between indications are both a function of the desired multiple of degrees to be detected. In addition, the magnetic flux sensitive transducers of magnetic sensing device 50 and magnetic sensing device 60 are positioned relative to the indications and to each other whereby digital signal $DS_1$ and digital signal $DS_2$ have a 50% duty cycle, and digital signal $DS_2$ is consistently ninety (90) degrees out of phase with digital signal $DS_1$.

Each rising edge and falling edge of digital signal $DS_1$ and digital signal $DS_2$ represents a desired multiple X of length to be detected, and therefore, each pule of pulse waveform $PS_1$ is generated upon each incremental pivotal displacement of rotary shaft 9 as a function of the desired multiple X of degrees to be detected. Consequently, a computer can monitor each rising edge and falling edge of digital signal $DS_1$ and digital signal $DS_2$ to thereby ascertain each incremental pivotal displacement of rotary shaft 9, and/or a pulse waveform like pulse waveform PSI can be inputted into an electronic device like a counter whereby the total number of incremental pivotal displacements can be ascertained. For embodiments of magnetic incremental pivotal motion detection system 12 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous pivotal displacement of target 40, digital signal $DS_3$ and digital signal $DS_4$ have the same duty cycle, and digital signal $DS_3$ and digital signal $DS_4$ are consistently out of phase by the same degree.

Figure 2B:
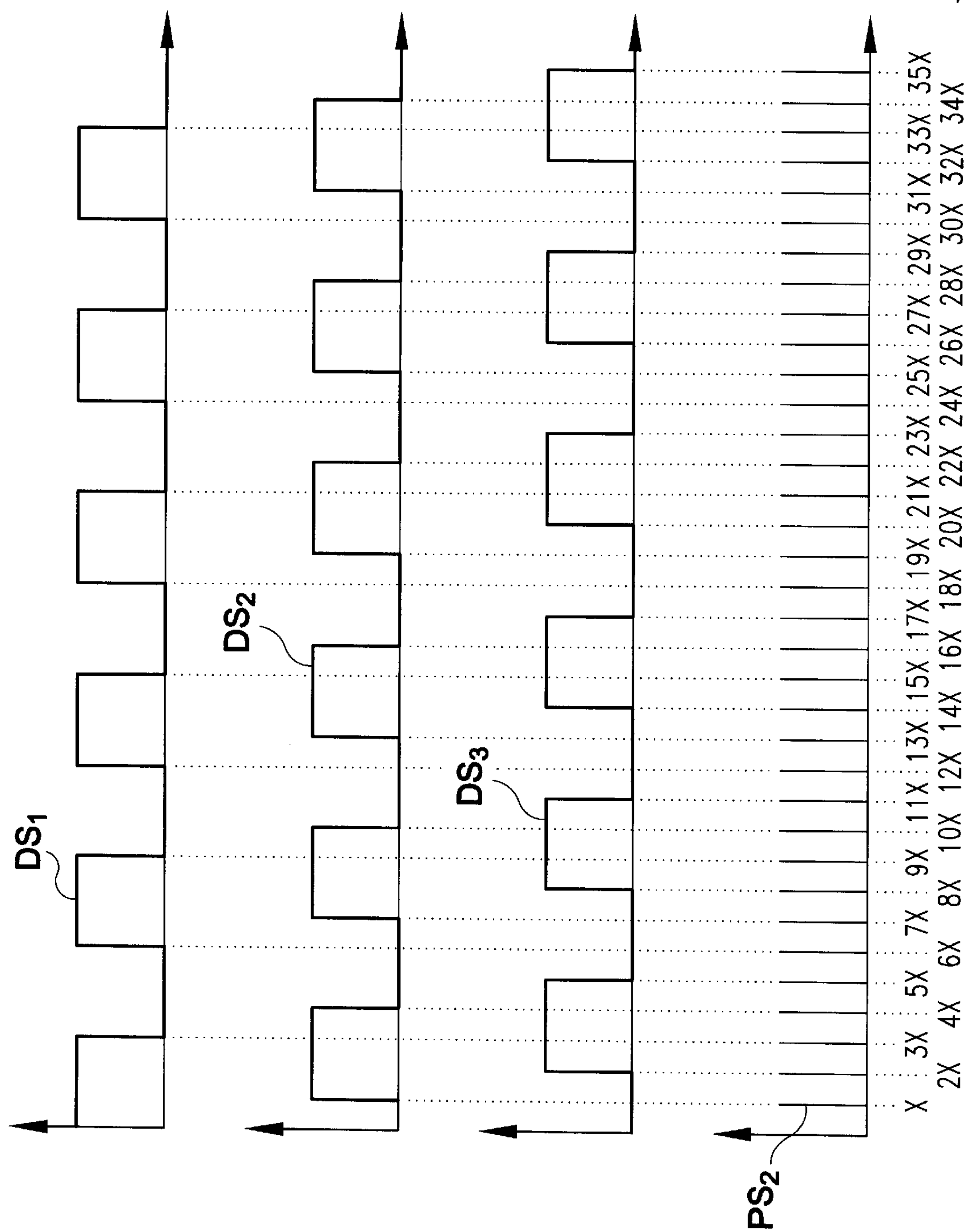
FIG. 2B is a set of a graphical waveforms of a trio of digital signals from a magnetic incremental motion detection system in accordance with the present invention, and a graphical waveform of a pulse signal as a function of the trio of digital signals.

Referring to FIG. 2B, the present invention contemplates that a magnetic incremental motion detection system, e.g. magnetic incremental rotational motion detection system 10 (FIG. 1A) can aggregately comprise three or more magnetic sensing device operable to output a digital signal. Accordingly, a pulse waveform $PS_2$ is shown as a function of digital signal $DS_1$ as outputted by magnetic sensing device 50 (FIGS. 1A–1C), digital signal $DS_2$ as outputted by magnetic sensing device 60 (FIGS. 1A–1C), and a digital signal $DS_5$ as outputted by a third magnetic sensing device. Digital signal $DS_1$, digital signal $DS_2$, and digital signal $DS_5$ all have a 50% duty cycle. Digital signal $DS_2$ is consistently sixty (60) degrees out of phase with digital signal $DS_1$, and digital signal $DS_3$ is consistently sixty (60) degrees out of phase with digital signal $DS_2$. Consequently, a greater number of pulses of pulse waveform $PS_2$ are generated over the same range of movement of an object than the generated pulses of pulse waveform $PS_1$ (FIG. 2A).

Figure 3A:
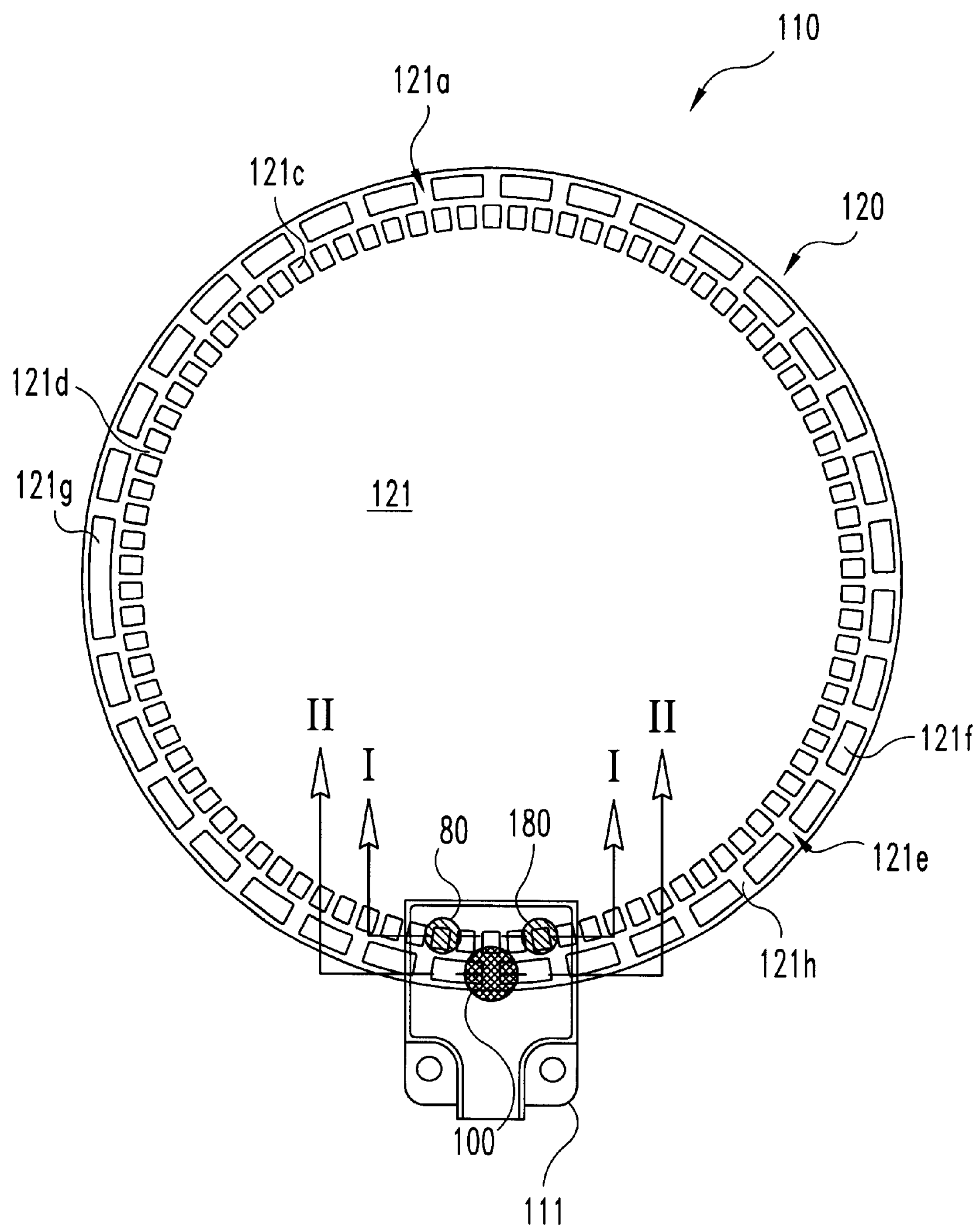
FIG. 3A is a bottom plan view of a preferred embodiment of the magnetic incremental rotational motion detection system of FIG. 1A.

Referring to FIG. 3A, a magnetic incremental rotational motion detection system 110 as one embodiment of magnetic incremental rotational motion detection system 10 (FIG. 1A) is shown. Magnetic incremental rotational motion detection system 110 comprises a target wheel 120. Target wheel 120 has a planar annular surface 121 with ninety (90) rectangular holes 121*c* disposed therethrough, and uniformly and serially spaced along an annular area 121*a* to thereby define ninety (90) ribs 121*d* whereby a width of each hole 121*a* is identical and a width of each rib 121*d* is identical. Preferably, target wheel 120 is ferromagnetic, the diameter of target wheel 120 is between six (6) and ten (10) inches, a width of each slot 121*c* is approximately 2.62 degrees, and a width of each rib 121*d* is 1.38 degrees. Magnetic incremental rotational motion detection system 110 further comprises a magneto-resistance sensor 80, a magneto-resistance sensor 180. For purposes of the present invention, magneto-resistance sensor 80 and magneto-resistance sensor 180 are defined as any combination of manufactured articles including at least one magneto-resistor in series between an input terminal and a reference terminal, and electrically coupled to an output terminal to thereby output an analog signal in response to a magnetic flux density of any magnetic flux flowing through the magneto-resistor(s).

Figure 3B:
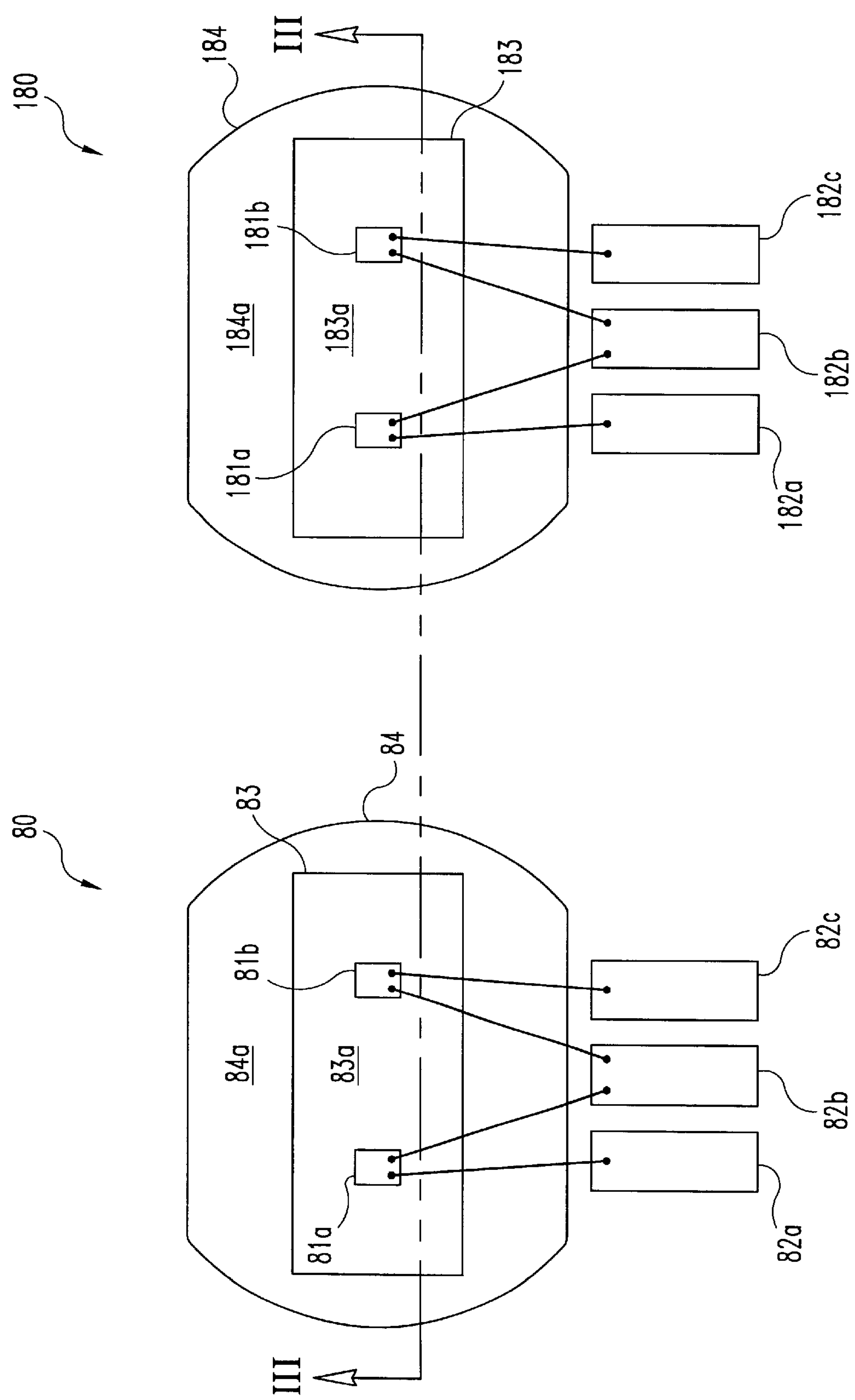
FIG. 3B are top plan views of an embodiment of a pair of magneto-resistance sensors of FIG. 3A.
Figure 3C:
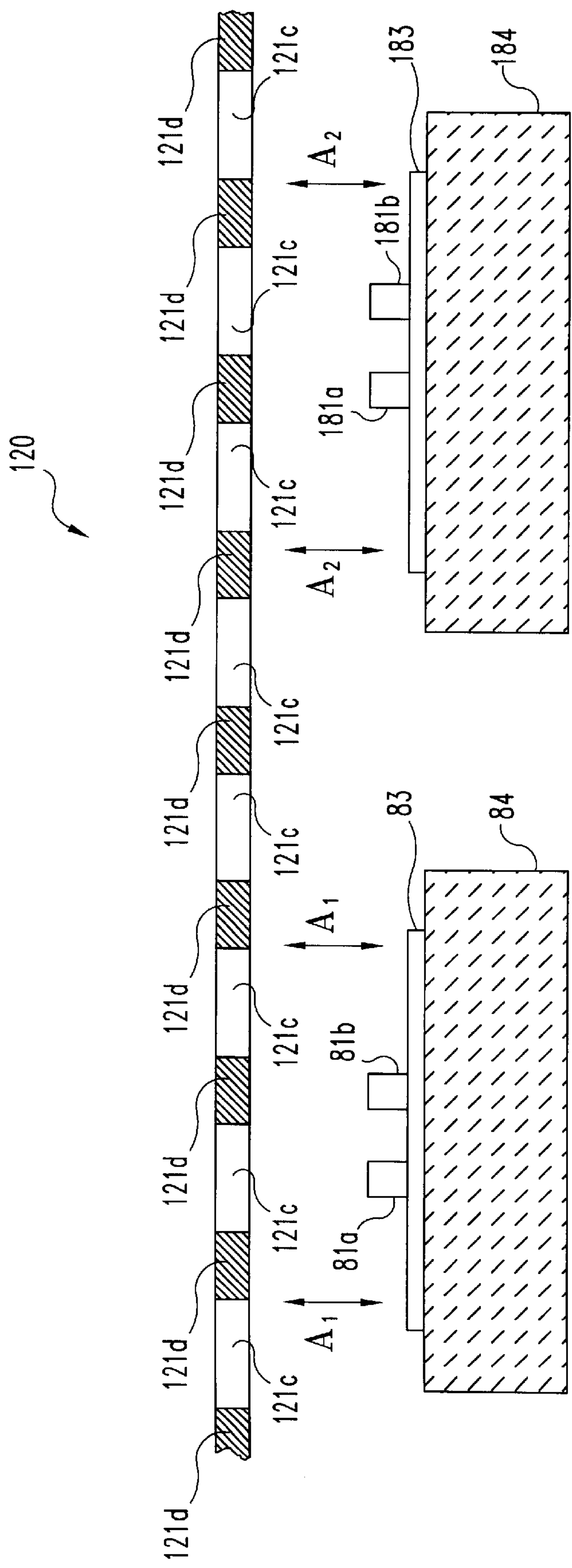
FIG. 3C are cross-sectional side views of the magneto-resistance sensors of FIG. 3B taken along line III—III as spatially positioned from a cross-sectional side view of a target wheel of FIG. 3A taken along line I—I.

Referring to FIGS. 3B and 3C, magneto-resistance sensor 80 includes a magneto-resistor element 81*a*, a magneto-resistor 81*b*, a contact 82*a* as an input terminal, a contact 82*b* as an output terminal, a contact 82*c* as a reference terminal, a conductive layer 83, and a magnet 84. Magneto-resistor 81*a* and magneto-resistor 81*b* are disposed on surface 83*a* of conductive layer 83, and conductive layer 83 is disposed one a pole surface 84*a*, north or south, of magnet 84. Preferably, pole surface 84*a* is a north pole surface of magnet 84. Magneto-resistor 81*a* and magneto-resistor 81*b* are spatially positioned from target wheel 120 to define an air gap area $A_1$ therebetween whereby a magnetic field (not shown) as generated by magnet 84 traverses air gap area $A_1$. Magneto-resistor 81*a* is electrically coupled to contact 82*a* and to contact 82*b*, and magneto-resistor 81*b* is electrically coupled to contact 82*b* and to contact 82*c* to thereby output an analog signal from contact 82*b* when a power source is electrically coupled to contact 82*a* and a common reference is electrically coupled to contact 82*c*. Preferably, magneto-resistor 81*a* and magneto-resistor 81*b* are made from the same die with the same dimensions; magneto-resistor 81*a* and magneto-resistor 81*b* are spaced by a 0.559 magnetic wavelength; and air gap area $A_1$ varies if at all between 0.5 millimeters and two (2) millimeters to thereby output the analog signal. Incremental rotational motion detection system 110 can further comprises a digital circuit (not shown) electrically coupled to contact 82*b* to thereby input the analog signal whereby the digital circuit can output a digital signal, e.g. digital signal $DS_1$ (FIGS. 2A and 2B).

Magneto-resistance sensor 180 includes a magneto-resistor element 181*a*, a magneto-resistor 181*b*, a contact 182*a* as an input terminal, a contact 182*b* as an output terminal, a contact 182*c* as a reference terminal, a conductive layer 183, and a magnet 184. Magneto-resistor 181*a* and magneto-resistor 181*b* are disposed on surface 183*a* of conductive layer 183, and conductive layer 183 is disposed one a pole surface 184*a*, north or south, of magnet 184. Preferably, pole surface 184*a* is a north pole surface of magnet 184. Magneto-resistor 181*a* and magneto-resistor 181*b* are spatially positioned from target wheel 120 to define an air gap area $A_2$ therebetween whereby a magnetic field (not shown) as generated by magnet 184 traverses air gap area $A_2$. Magneto-resistor 181*a* is electrically coupled to contact 182*a* and to contact 182*b*, and magneto-resistor 181*b* is electrically coupled to contact 182*b* and to contact 182*c* to thereby output an analog signal from contact 182*b* when a power source is electrically coupled to contact 182*a* and a common reference is electrically coupled to contact 182*c*. Preferably, magneto-resistor 181*a* and magneto-resistor 181*b* are made from the same die with the same dimensions; magneto-resistor 181*a* and magneto-resistor 181*b* are spaced by a 0.559 magnetic wavelength; magnet 84 and magnet 184 are sufficiently spaced to prevent any magnetic interaction between magnet 84 and magnet 184; and air gap area $A_2$ varies if at all between 0.5 millimeters and two (2) millimeters to thereby output the analog signal. Incremental rotational motion detection system 110 can further comprises a digital circuit (not shown) electrically coupled to contact 182*b* to thereby input the analog signal whereby the digital circuit can output a digital signal, e.g. digital signal $DS_2$ (FIGS. 2A and 2B).

An exemplary operation of magneto-resistance sensor 80, and various embodiments of a digital circuit in accordance with the present invention will now be described herein.

Figure 3D:
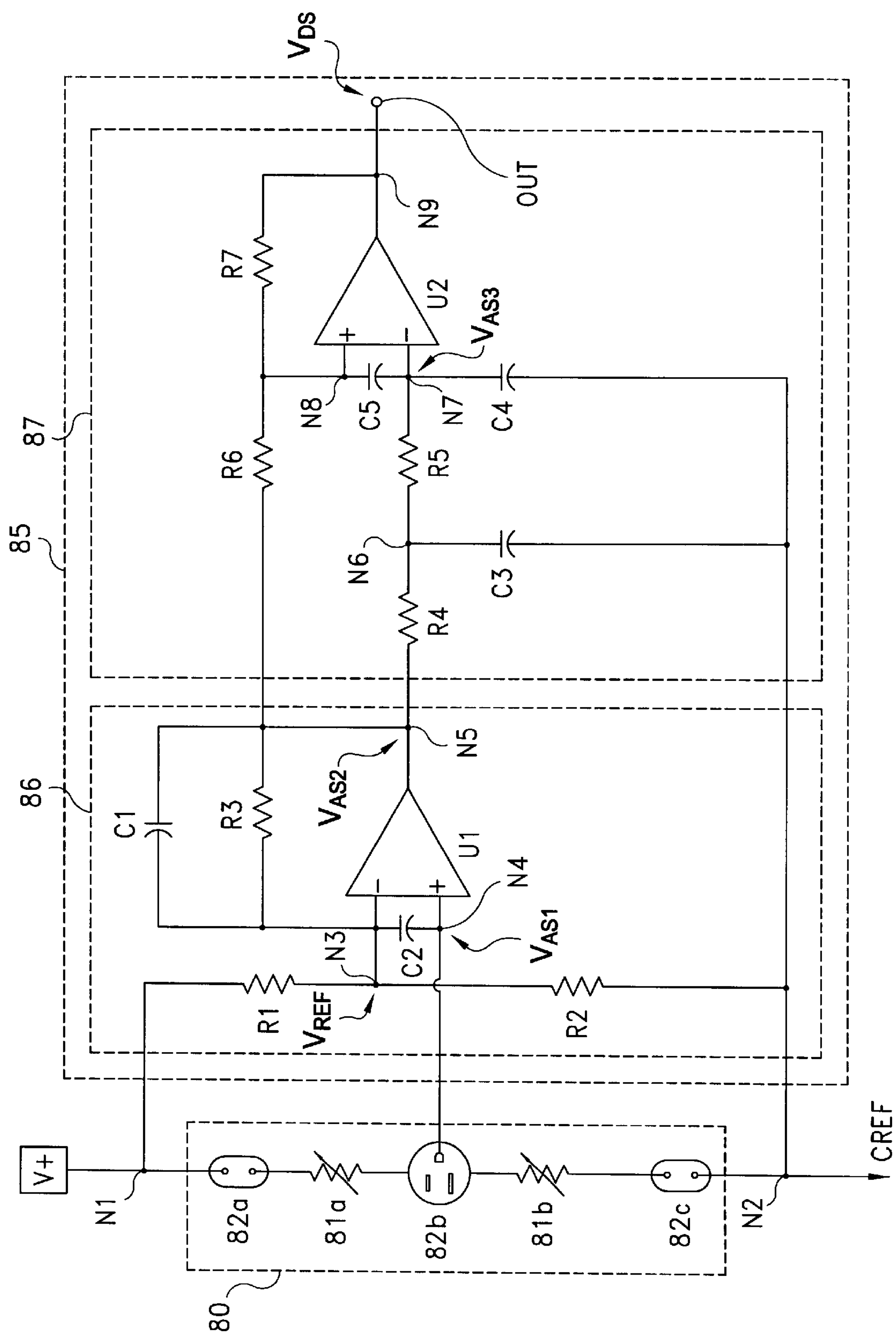
FIG. 3D is a schematic diagram of a first embodiment of a magnetic sensing device of FIG. 3A.

Referring to FIG. 3D, a schematic diagram of magneto-resistance sensor 80, and a digital circuit 85 in accordance with the present invention is shown. Contact 82*a* of magneto-resistance sensor 80 is electrically coupled to a node N1. Contact 82*b* of magneto-resistance sensor 80 is electrically coupled to a node N4. Contact 82*c* of magneto-resistance sensor 80 is electrically coupled to a node N2. Digital circuit 85 comprises a signal amplification stage 86, and a signal comparison stage 87. Signal amplification stage 85 includes a resistor R1, a resistor R2, an operational amplifier U1, a resistor R3, a capacitor C1, and an optional capacitor C2. Resistor R1 is electrically coupled to node N1 and a node N3. Resistor R2 is electrically coupled to node N2 and node N3. A positive power supply terminal (not shown) of operational amplifier U1 is electrically coupled to node N1. A negative power supply terminal (not shown) of operational amplifier U1 is electrically coupled to node N2. An inverting terminal of operational amplifier U1 is electrically coupled to node N3. A non-inverting terminal of operational amplifier U1 is electrically coupled to node N4. An output terminal of operational amplifier U1 is electrically coupled to node N5. Resistor R3 is electrically coupled to node N3 and a node N5. Capacitor C1 is electrically coupled to node N3 and node N5. Capacitor C2 is electrically coupled to node N3 and node N4.

Signal comparison stage 87 includes a resistor R4, a capacitor C3, a resistor R5, a capacitor C4, a comparator U2, a resistor R6, a resistor R7, and an optional capacitor C5. Resistor R4 is electrically coupled to node N5 and a node N6. Capacitor C3 is electrically coupled to node N2 and node N6. Resistor R5 is electrically coupled to node N6 and a node N7. Capacitor C4 is electrically coupled to node N2 and node N7. A positive power supply terminal (not shown) of comparator U2 is electrically coupled to node N1. A negative power supply terminal (not shown) comparator U2 is electrically coupled to node N2. An inverting terminal of comparator U2 is electrically coupled to node N7. A non-inverting terminal of comparator U2 is electrically coupled to a node N8. An output terminal of comparator U2 is electrically coupled to node N9. Resistor R6 is electrically coupled to node N5 and node N8. Resistor R7 is electrically coupled to node N8 and node N9. Capacitor C5 is electrically coupled to node N7 and N8.

When a positive supply voltage V+ is applied to node N1, and a common reference CREF is applied to node N2, a voltage reference signal $V_{REF}$ is established at node N3, and a voltage analog signal $V_{AS1}$ is established at node N4. It is to be appreciated that voltage analog signal $V_{AS1}$ is representative of any rotation of target wheel 120 (FIG. 3A). A voltage analog signal $V_{AS2}$ is established at node N5 as an amplification of voltage analog signal $V_{AS1}$. Preferably, the resistance value of resistor R1, the resistance value of resistor R2, the resistance value of resistor R3, the impedance value of operational amplifier U1, the reactance value of capacitor C1, and the reactance value of capacitor C2 are selected in view of positive voltage supply V+ and common reference CREF to achieve a gain of twenty-one (21). A voltage analog signal $V_{AS3}$ is established at node N7 as a filtrate of voltage analog signal $V_{AS2}$. The resistance value of resistor R4, the reactance value of capacitor C3, the resistance value of resistor R5, and the reactance value of capacitor C4 are selected to ensure voltage analog signal $V_{AS3}$ is a dynamic reference voltage that compensates for any drift in voltage analog signal $V_{AS1}$. Comparator U2 establishes a voltage digital signal $V_{DS}$ at node N9. The impedance value of comparator U2 is selected to ensure voltage digital signal $V_{DS}$ has a logic high level and a logic low level. The resistance values of resistor R6 and resistor R7 are selected to stabilize voltage digital signal $V_{DS}$. It is to be appreciated that voltage digital signal $V_{DS}$ is representative of each occurrence of voltage analog signal $V_{AS1}$ crossing over half of positive voltage supply V+.

Figure 3E:
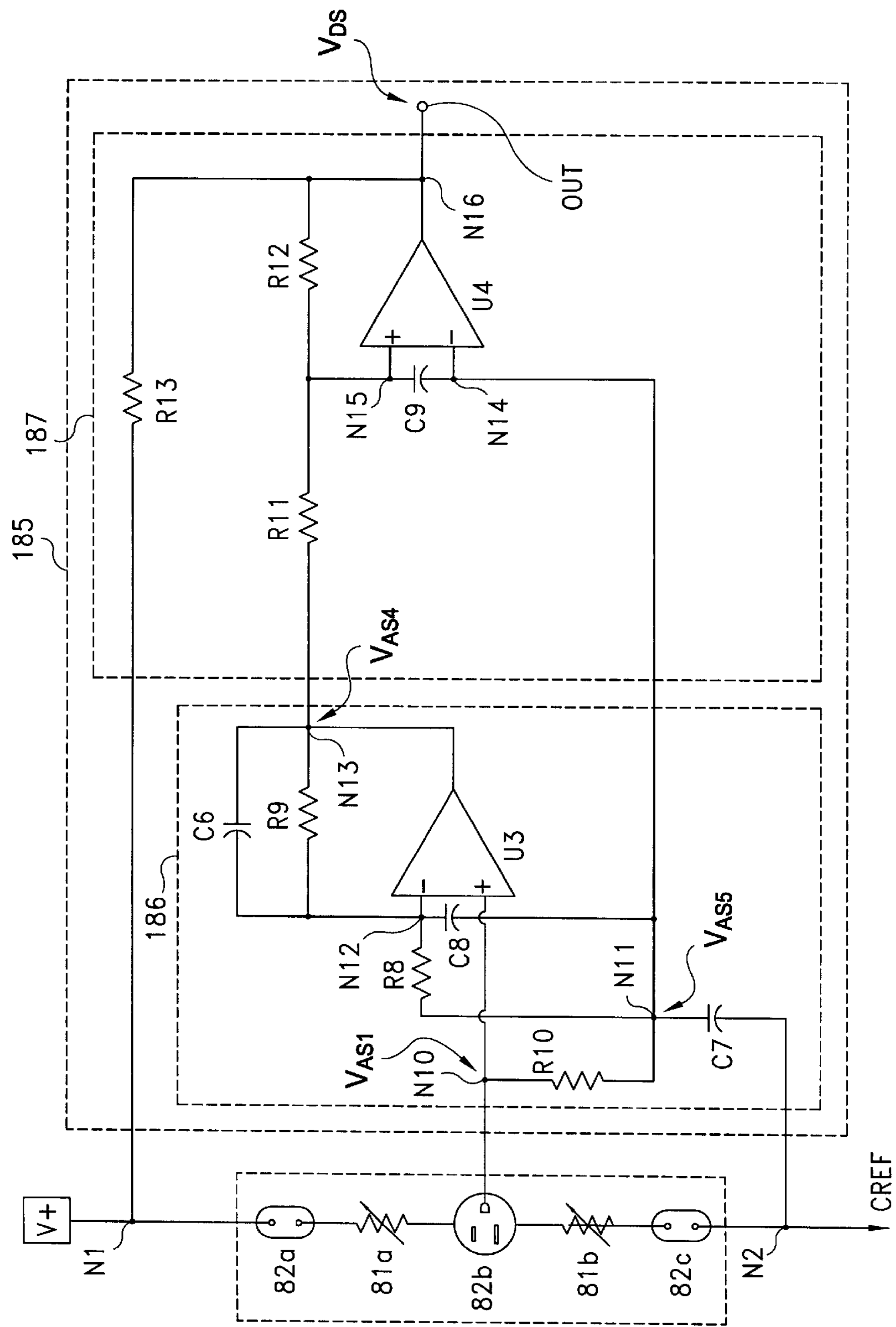
FIG. 3E is a schematic diagram of a second embodiment of a magnetic sensing device of FIG. 3A.

Referring to FIG. 3E, a schematic diagram of magneto-resistance sensor 80, and a digital circuit 185 in accordance with the present invention is shown. Contact 82*a* of magneto-resistance sensor 80 is electrically coupled to node N1. Contact 82*b* of magneto-resistance sensor 80 is electrically coupled to a node N1. Contact 82*c* of magneto-resistance sensor 80 is electrically coupled to node N2. Digital circuit 185 comprises a signal amplification stage 186, and a signal comparison stage 187. Signal amplification stage 185 includes a resistor R8, an operational amplifier U3, a resistor R9, a capacitor C6, a resistor R10, a capacitor C7, and an optional capacitor C8. Resistor R8 is electrically coupled to a node N11 and a node N12. A positive power supply terminal (no t shown) of operational amplifier U3 is electrically coupled to node N1. A negative power supply terminal (not shown) of operational amplifier U1 is electrically coupled to node N2. An inverting terminal of operational amplifier U1 is electrically coupled to node N12. A non-inverting terminal of operational amplifier U1 is electrically coupled to node N10. An output terminal of operational amplifier U1 is electrically coupled to a node N13. Resistor R9 is electrically coupled to node N12 and node N13. Capacitor C6 is electrically coupled to node N12 and node N13. Resistor R10 is electrically coupled to node N310 and node N11. Capacitor C7 is electrically coupled to node N2 and node N11. Capacitor C8 is electrically coupled to node N8 and node N11.

Signal comparison stage 187 includes a comparator U4, a resistor R11, a resistor R12, an optional resistor R13, and an optional capacitor C9. A positive power supply terminal (not shown) of comparator U4 is electrically coupled to node N1. A negative power supply terminal (not shown) of comparator U4 is electrically coupled to node N2. An inverting terminal of comparator U4 is electrically coupled to node N11 via a node N4. A non-inverting terminal of comparator U4 is electrically coupled to node N15. An output terminal of comparator U4 is electrically coupled to node N16. Resistor R11 is electrically coupled to node N13 and node N15. Resistor R12 is electrically coupled to node N15 and node N16. Capacitor C9 is electrically coupled to node N14 and N15.

When a positive supply voltage V+ is applied to node N1, and a common reference CREF is applied to node N2, voltage analog signal $V_{AS1}$ is established at node N10. It is again to be appreciated that voltage analog signal $V_{AS1}$ is representative of any rotation of target wheel 120 (FIG. 3A). A voltage analog signal $V_{AS4}$ is established at node N13 as an amplification of voltage analog signal $V_{AS1}$. Preferably, the impedance value of operational amplifier U1, the resistance value of resistor R9, the reactance value of capacitor C6, and the reactance value of capacitor C8 are selected in view of positive voltage supply V+ and common reference CREF to achieve a gain of twenty-one (21). A voltage analog signal $V_{AS5}$ is established at node N11 as a filtrate of voltage analog signal $V_{AS1}$. The resistance value of resistor R8, the resistance value of resistor R1O, and the reactance value of capacitor C7 are selected to ensure voltage analog signal $V_{AS5}$ is a dynamic reference voltage that compensates for any drift in voltage analog signal $V_{AS1}$. Comparator U4 establishes voltage digital signal $V_{DS}$ at node N15. The impedance value of comparator U4 and the resistance value of resistor R13 is selected to ensure voltage digital signal $V_{DS}$ has a logic high level and a logic low level. The resistance values of resistor R11 and resistor R12 are selected to stabilize voltage digital signal $V_{DS}$. It is to be appreciated that voltage digital signal $V_{DS}$ is representative of each occurrence of voltage analog signal $V_{AS1}$ crossing over half of positive voltage supply V+.

Figure 3F:
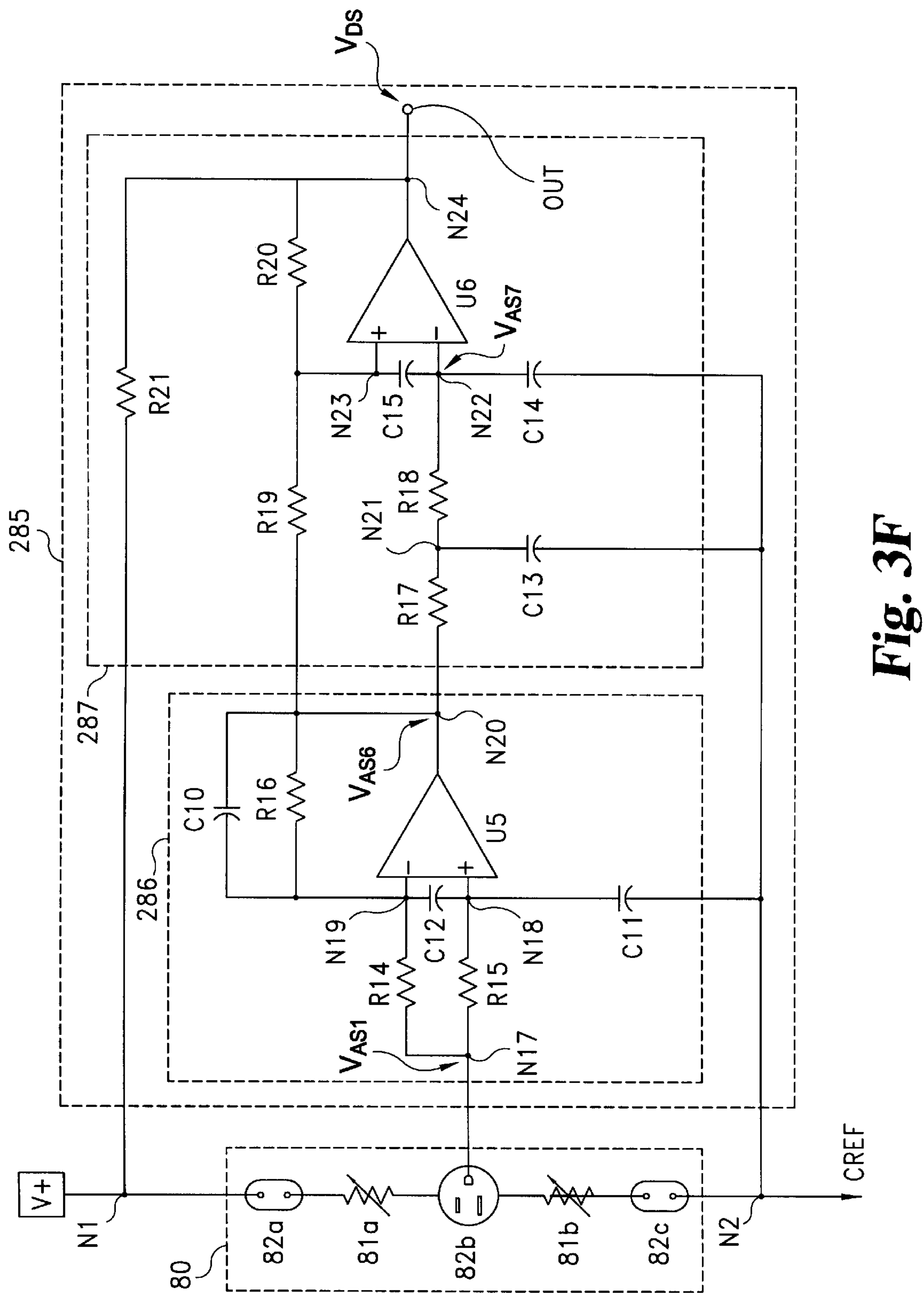
FIG. 3F is a schematic diagram of a third embodiment of a magnetic sensing device of FIG. 3A.

Referring to FIG. 3F, a schematic diagram of magneto-resistance sensor 80, and a digital circuit 285 in accordance with the present invention is shown. Contact 82*a* of magneto-resistance sensor 80 is electrically coupled to node N1. Contact 82*b* of magneto-resistance sensor 80 is electrically coupled to a node N17. Contact 82*c* of magneto-resistance sensor 80 is electrically coupled to node N2. Digital circuit 285 comprises a signal amplification stage 286, and a signal comparison stage 287. Signal amplification stage 285 includes a resistor R14, a resistor R15, an operational amplifier U5, a resistor R16, a capacitor C10, a capacitor C11, and an optional capacitor C 12. Resistor R14 is electrically coupled to node N17 and a node N19. Resistor R15 is electrically coupled to node N17 and a node N18. A positive power supply terminal (not shown) of operational amplifier U3 is electrically coupled to node N1. A negative power supply terminal (not shown) of operational amplifier U1 is electrically coupled to node N2. An inverting terminal of operational amplifier U1 is electrically coupled to node N19. A non-inverting terminal of operational amplifier U1 is electrically coupled to node N 18. An output terminal of operational amplifier U1 is electrically coupled to a node N30. Resistor R16 is electrically coupled to node N19 and node N20. Capacitor C10 is electrically coupled to node N19 and node N20. Capacitor C11 is electrically coupled to node N2 and node N18. Capacitor C12 is electrically coupled to node N18 and node N19.

Signal comparison stage 287 includes a resistor R17, a capacitor C13, a resistor R18, a capacitor C14, a comparator U6, a resistor R19, a resistor R20, a resistor R21, and an optional capacitor C15. Resistor R17 is electrically coupled to node N20 and a node N21. Capacitor C13 is electrically coupled to node N2 and node N21. Resistor R18 is electrically coupled to node N21 and a node N22. Capacitor C14 is electrically coupled to node N2 and a node N22. A positive power supply terminal (not shown) of comparator U6 is electrically coupled to node N1. A negative power supply terminal (not shown) comparator U6 is electrically coupled to node N2. An inverting terminal of comparator U6 is electrically coupled to node N22. A non-inverting terminal of comparator U6 is electrically coupled to a node N23. An output terminal of comparator U6 is electrically coupled to node N24. Resistor R19 is electrically coupled to node N20 and node N23. Resistor R20 is electrically coupled to node N23 and node N24. Resistor R21 is electrically coupled to node N2 and node N24. Capacitor C15 is electrically coupled to node N22 and N23.

When a positive supply voltage V+ is applied to node N1, and a common reference CREF is applied to node N2, voltage analog signal $V_{AS1}$ is established at node N17. It is again to be appreciated that voltage analog signal $V_{AS1}$ is representative of any rotation of target wheel 120 (FIG. 3A). A voltage analog signal $V_{AS6}$ is established at node N20 as an amplification of voltage analog signal $V_{AS1}$. Preferably, the resistance value of resistor R14, the resistance value of resistor R15, the impedance value of operational amplifier U5, the resistance value of resistor R16, the reactance value of capacitor C10, the reactance value of capacitor C1, and the reactance value of capacitor C12 are selected in view of positive voltage supply V+ and common reference CREF to achieve a gain of twenty-one (21). A voltage analog signal $V_{AS7}$ is established at node N22 as a filtrate of voltage analog signal $V_{AS6}$. The resistance value of resistor R17, the reactance value of capacitor C13, the resistance value of resistor R18, and the reactance value of capacitor C14 are selected to ensure voltage analog signal $V_{AS7}$ is a dynamic reference voltage that compensates for any drift in voltage analog signal $V_{AS1}$. Comparator U6 establishes a voltage digital signal $V_{DS}$ at node N24. The impedance value of comparator U6 and the resistance value of resistor R21 is selected to ensure voltage digital signal $V_{DS}$ has a logic high level and a logic low level. The resistance values of resistor R19 and resistor R20 are selected to stabilize voltage digital signal $V_{DS}$. It is to be appreciated that voltage digital signal $V_{DS}$ is representative of each occurrence of voltage analog signal $V_{AS1}$ crossing over half of positive voltage supply V+.

Figure 3G:
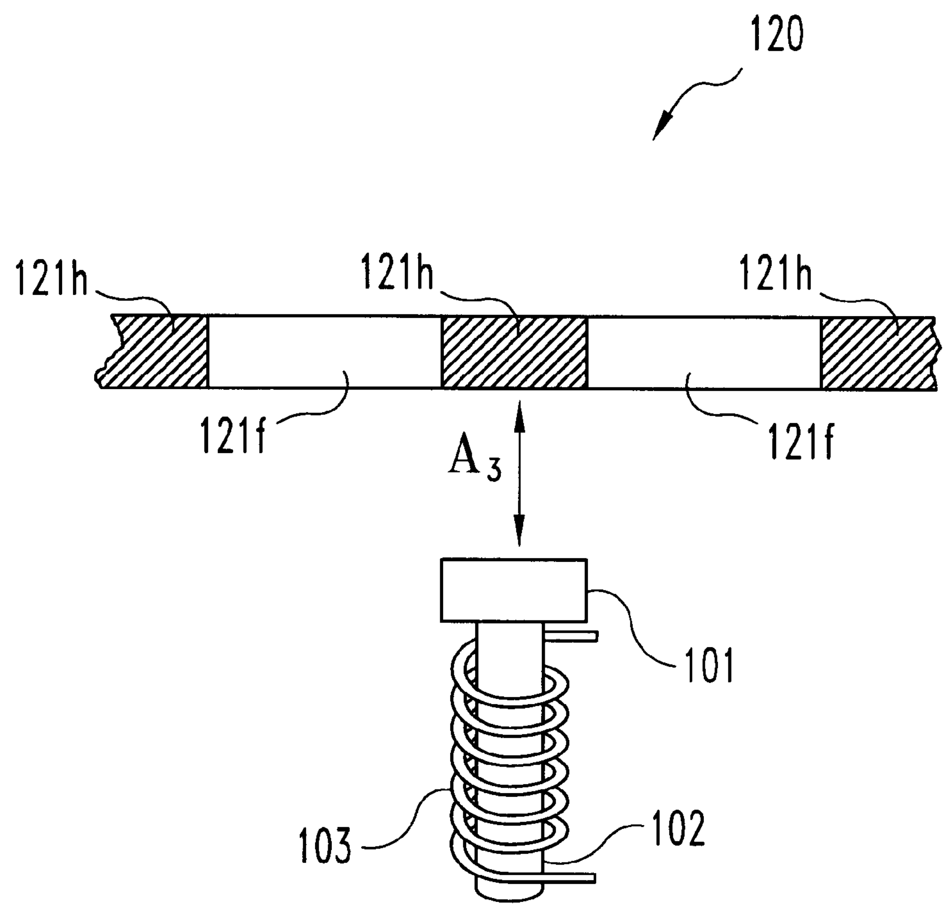
FIG. 3G is a side view of a variable-reluctance sensor of FIG. 3A as spatially positioned from a cross-sectional side view of the target wheel of FIG. 3A taken along line II—II.

Referring to FIGS. 3A and 3G, incremental rotational motion detection system 110 optionally comprises a variable-reluctance sensor 100. For purposes of the present invention, variable-reluctance sensor 100 is defined as any combination of manufactured articles including a coil having a pair of terminals to thereby generate and output an analog signal as a function of a variant in a magnetic flux density of any magnetic flux flowing through coil. The present invention contemplates the variable-reluctance sensor may or may not have one or more pole pieces, and/or one or more magnets. Preferably, variable-reluctance sensor 100 includes a magnet 101 having one of its pole surface spatially positioned from an annular area 121*e* of surface 121 to define an air gap area $A_3$ therebetween whereby a magnetic field (not shown) generated by magnet 101 traverses air gap area $A_3$, a pole piece 102 adjacently disposed with the other pole surface of magnet 101, and a coil 103 disposed around the pole piece 102 to thereby generate an analog signal. It is further preferred that the north pole surface of magnet 84 (FIGS. 3B and 3C), the north pole surface of magnet 184 (FIGS. 3B and 3C), and the north pole surface of magnet 101 are facing target wheel 120 to thereby allow magneto-resistance sensor 80, magneto-resistor sensor 180, and variable reluctance sensor 100 to be adjacently disposed within a housing 111.

When magnetic incremental rotational motion detection system 110 comprises variable-reluctance sensor 100 as shown, surface 121 preferably has thirty-four (34) rectangular holes 121*f* disposed therethrough, and uniformly and serially spaced along annular area 121*e*, and a rectangular hole 121*g* disposed therethrough and uniformly spaced between two holes 121*f* to thereby define thirty-five (35) ribs 121*h* whereby a width of each hole 121*f* is identical, a width of each rib 121*h* is identical, and a width of hole 121*g* is slightly greater than twice the width of a hole 121*f*. The present invention contemplates that annular area 121*e* can be located at radial positions from a center 121*b* of surface 121 that are greater than the radial positions of annular area 121*a* from center 121*b* as shown, or less than the radial positions of annular area 121*a* from center 121*b*. A width of magnet 100 is no greater than the width of holes 121*f*. Preferably, the width of magnet 100 is identical the width of holes 121*f* as shown whereby coil 103 will generate and output an analog signal as a sine wave in response to an synchronous rotation of target wheel 120 with an object, e.g. rotary shaft 9, when magnet 100 is facing a portion of a hole 121*f* or a rib 121*h*, and coil 103 will not generate and output the analog signal when magnet 100 is completely facing hole 121*g*. This is beneficial because magneto-resistor 80 and magneto-resistor 180 can be utilized in an engine timing of an electric motor, and variable-reluctance sensor 100 can be utilized in an ignition timing of the electric motor while the three (3) sensor are adjacently disposed within housing 111. In addition, target wheel 120 can be disposed between the three sensors and a magnetic interference generating device, e.g. an open frame electric motor, whereby target wheel 120 will serve as a shielding device that prevents an interference by any electrical or magnetic noise from magnetic interference generating device with the outputting of the analog signals from the three magnetic sensors.

Figure 4A:
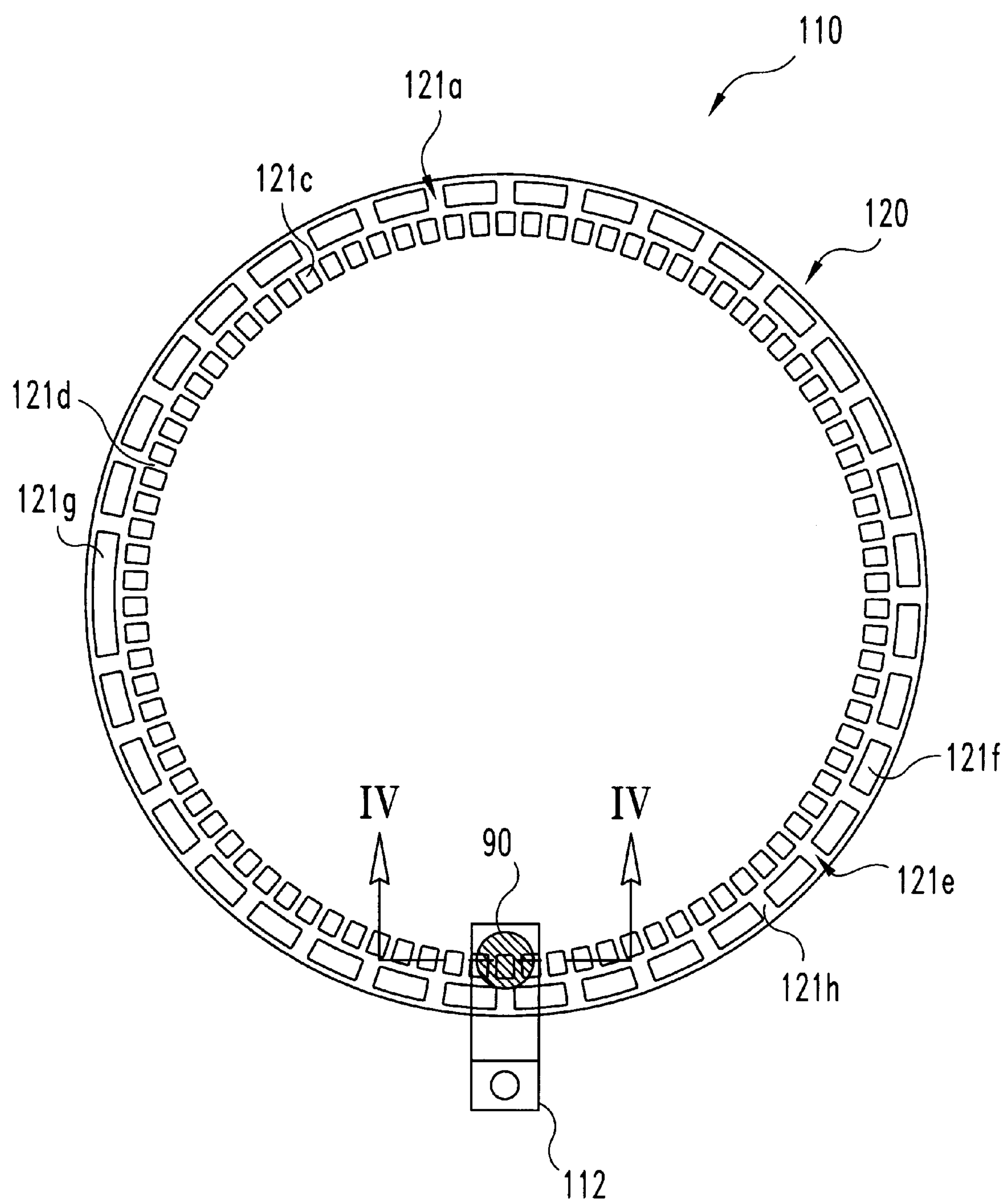
FIG. 4A is a bottom plan view of a second embodiment of the magnetic incremental rotational motion detection system of FIG. 4A.

Referring to FIG. 4A, a magnetic incremental rotational motion detection system 210 as an another embodiment of magnetic incremental rotational motion detection system 10 (FIG. 1A) is shown. Magnetic incremental rotational motion detection system 210 comprises target wheel 120 as previously illustrated herein in connection with FIG. 3A and described in the accompanying text. Magnetic incremental rotational motion detection system 110 further comprises a magneto-resistance sensor 90. For purposes of the present invention, magneto-resistance sensor 90 is defined as any combination of manufactured articles including a first set of at least one magneto-resistor in series between a first input terminal and a first reference terminal, and electrically coupled to a first output terminal to thereby output a first analog signal as a function of a magnetic flux density of any magnetic flux flowing through the first set of at least one magneto-resistor(s), and further including a second set of at least one magneto-resistor in series between a second input terminal and a second reference terminal, and electrically coupled to a second output terminal to thereby output a second analog signal as a function of a magnetic flux density of any magnetic flux flowing through the second set of at least one magneto-resistor(s).

Figure 4B:
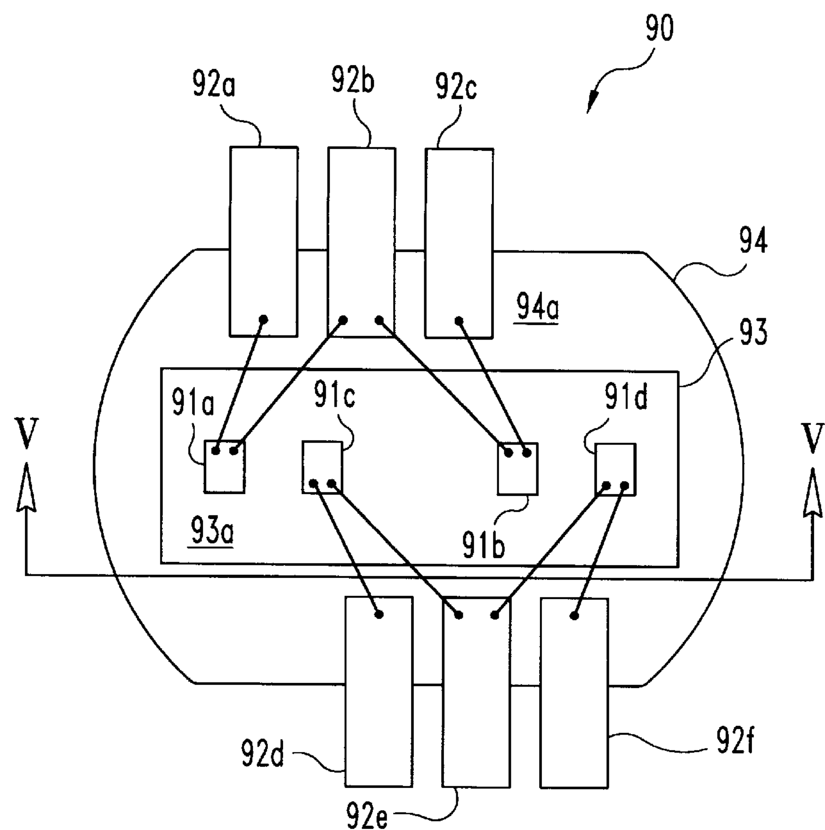
FIG. 4B is a top plan view of an embodiment of a magneto-resistance sensor of FIG. 4A.
Figure 4C:
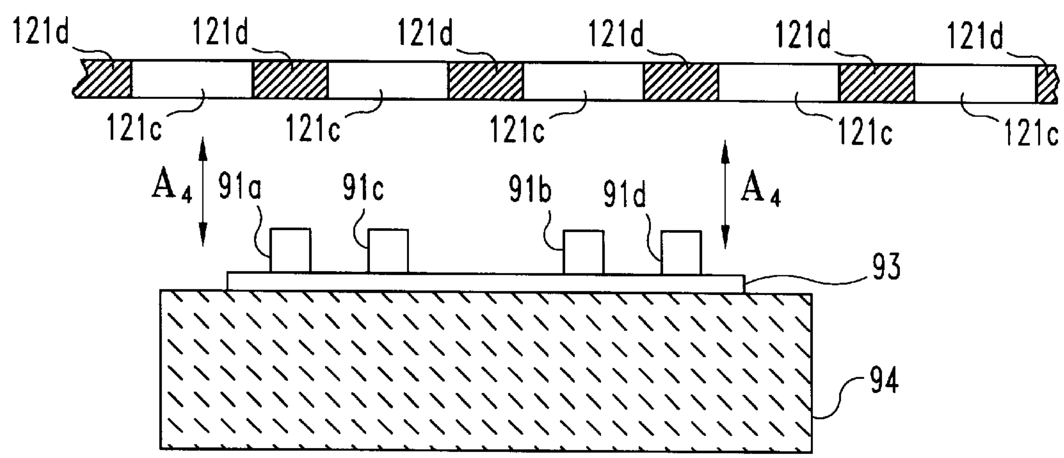
FIG. 4C is a cross-sectional side view of the magneto-resistance sensor of FIG. 4B taken along line V—V as spatially positioned from a cross-sectional view of a target wheel of FIG. 4A taken along line IV—IV.

Referring to FIGS. 4B and 4C, magneto-resistance sensor 90 includes a magneto-resistor element 91*a,* a magneto-resistor 91*b,* a magneto-resistor element 91*c,* a magneto-resistor 91*d,* a contact 92*a* as an input terminal, a contact 92*b* as an output terminal, a contact 92*c* as a reference terminal, a contact 92*d* as an input terminal, a contact 92*e* as an output terminal, a contact 92*f* as a reference terminal, a conductive layer 93, and a magnet 94. Magneto-resistor 91*a,* magneto-resistor 91*b,* magneto-resistor 91*c,* and magneto-resistor 91*d* are disposed on surface 93*a* of conductive layer 93, and conductive layer 93 is disposed one a pole surface 94*a,* north or south, of magnet 94. Preferably, pole surface 94*a* is a north pole surface of magnet 94. Magneto-resistor 91*a,* magneto-resistor 91*b,* magneto-resistor 91*c,* and magneto-resistor 91*d* are spatially positioned from target wheel 120 to define an air gap area A4 therebetween whereby a magnetic field (not shown) as generated by magnet 94 traverses air gap area A4. Magneto-resistor 91*a* is electrically coupled to contact 92*a* and to contact 92*b,* and magneto-resistor 91*b* is electrically coupled to contact 92*b* and to contact 92*c* to thereby output an analog signal from contact 92*b* when a power source is electrically coupled to contact 92*a* and a common reference is electrically coupled to contact 92*c.* Magneto-resistor 91*c* is electrically coupled to contact 92*d* and to contact 92*e,* and magneto-resistor 91*d* is electrically coupled to contact 92*e* and to contact 92*f* to thereby output an analog signal from contact 92*e* when a power source is electrically coupled to contact 92*d* and a common reference is electrically coupled to contact 92*f.*

Preferably, magneto-resistor 91*a,* magneto-resistor 91*b,* magneto-resistor 91*c,* and magneto-resistor 91*d* are made from the same die with the same dimensions; magneto-resistor 91*a* and magneto-resistor 91*c* are spaced by a 0.279 magnetic wavelength; magneto-resistor 91*b* and magneto-resistor 91*c* are spaced by a 0.559 magnetic wavelength; magneto-resistor 91*b* and magneto-resistor 91*d* are spaced by a 0.279 magnetic wavelength; and air gap area A4 varies if at all between 0.5 millimeters and two (2) millimeters to thereby output the analog signal from contact 92*b* and output the analog signal from contact 92*e.* Incremental rotational motion detection system 210 can further comprise a first digital circuit (not shown) electrically coupled to contact 182*b* to thereby input the analog signal whereby the first digital circuit can output a first digital signal, e.g. digital signal $DS_1$ (FIGS. 2A and 2B), and a second digital circuit (not shown) electrically coupled to contact 182*e* to thereby input the whereby the second digital circuit can output a second digital signal, e.g. digital signal $DS_2$ (FIGS. 2A and 2B). Digital circuit 85 (FIG. 3D), digital circuit 185 (FIG. 3E), and digital circuit 285 (FIG. 2F) are examples of digital circuits for incremental rotational motion detection system 210. Incremental rotational motion detection system 210 can further comprise variablereluctance sensor 100 (FIG. 3A) adjacently disposed within a housing 112, and consequently target wheel 120 would therefore include holes 121*f,* hole 121*g,* and rib 121*h* disposed along annular area 121*e* as shown.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic incremental motion detection system for outputting a pair of digital signals as a collective representation of an incremental movement of an object, said magnetic incremental motion detection system comprising:

a target having a surface, said target adjoined to the object to thereby synchronously move with the object;

a plurality of indications adjoined to said surface of said target, said indications being serially and uniformly disposed along an area of said surface;

a first magnetic sensing device including means for outputting a first digital signal in response to a synchronous movement of said target with the object;

a second magnetic sensing device including means for outputting a second digital signal in response to said synchronous movement of said target with the object, said second digital signal being consistently out of phase by a same degree and uniformly offset with respect to said first digital signal to collectively represent incremental movement of the object; and a first magnet having a north pole and a south pole each having a pole face, wherein said first magnetic sensing device includes at least one magnetic flux sensing element aligned with one of said pole faces of said first magnet.

2. The system of claim 1, wherein each magnetic sensing device includes a half-bridge magnetoresistive sensor having first and second magnetoresistive elements connected in series.

3. The system of claim 2, wherein each magnetic sensing device further includes an amplifier and a low-pass filter, each said amplifier having first and second inputs, each of said first amplifier inputs being connected to its respective magnetoresistive sensor, each said low-pass filter being connected between its respective magnetoresistive sensor and its respective second amplifier input.

4. The system of claim 3, wherein each magnetic sensing device further includes a comparator having an input connected to its respective amplifier.

5. A magnetic incremental motion detection system, comprising:

a target having a surface, said target adjoined to the object to thereby synchronously move with the object;

a plurality of indications adjoined to said surface of said target, said indications being serially and uniformly disposed along an area of said surface;

a first magnetic sensor spatially positioned from said area of said surface to thereby define a first air gap area therebetween, said first magnetic sensor being operable to output a first analog signal having a first duty cycle in response to synchronous movement of said target with the object, said first magnetic sensor including at least one magnetic flux sensitive element;

a first linear amplifier having an input connected to said first magnetic sensor;

a first comparator having an input connected to said first amplifier;

a second magnetic sensor spatially positioned from said area of said target to thereby define a second air gap area therebetween, said second magnetic sensor being operable to output a second analog signal having a second duty cycle equal to said first duty cycle in response to said synchronous movement of said target with the object, said second magnetic sensor spaced from said first magnetic sensor such that said second analog signal is out of phase with said first analog signal;

a second linear amplifier having an input connected to said second magnetic sensor; and a second comparator having an input connected to said second amplifier, wherein said magnetic flux sensitive elements of said first and second magnetic sensors are each aligned with a pole face of a magnet.

6. The system of claim 5, wherein said first and second magnetic sensors include separate magnets.

7. The system of claim 6, wherein said separate magnets of said first and second magnetic sensors are sufficiently spaced to prevent magnetic interaction.

8. The system of claim 7, wherein each said magnetic sensor is a half-bridge magnetoresistive sensor.

9. The system of claim 5, wherein said first and second magnetic sensors share a common magnet.

10. The system of claim 9, wherein each said magnetic sensor is a half-bridge magnetoresistive sensor.

11. A method of detecting displacement with magnetic sensors, comprising:

positioning first and second magnetic sensing devices with respect to each other and with respect to target indications on a target wheel such that said magnetic sensing devices generate first and second digital signals which are out of phase with each other, said digital signals each having a plurality of pulses with rising and falling edges; and measuring incremental motion based on said rising and falling edges, wherein said measuring step includes generating a distinct pulse for each rising and falling edge of each pulse in said first and second digital signals, and counting said distinct pulses.

12. The method of claim 11, wherein said first and second magnetic sensing devices are positioned adjacent a single set of target indications on said target wheel.

13. The system of claim 1, wherein said second magnetic sensing device includes at least one magnetic flux sensitive element aligned with said one pole face of said first magnet.

14. The system of claim 1, further comprising a second magnet having a north pole and a south pole each having a pole face, wherein said second magnetic sensing device includes at least one magnetic flux sensitive element aligned with one of said pole faces of said second magnet.

15. The system of claim 1, wherein said first and second magnetic sensing devices are magnetoresistive sensing devices.

16. The system of claim 15, wherein at least one of said magnetoresistive sensing devices is a half-bridge magnetoresistive sensing device including first and second magnetoresistive elements connected in series.

17. A magnetic incremental motion detection system for outputting a pair of digital signals as a collective representation of an incremental movement of an object, said magnetic incremental motion detection system comprising:

a target having a surface, said target adjoined to the object to thereby synchronously move with the object;

a plurality of indications adjoined to said surface of said target, said indications being serially and uniformly disposed along an area of said surface;

a plurality of magnetic sensing devices, each of said plurality of magnetic sensing devices including means for outputting a digital signal in response to a synchronous movement of said target with the object, said digital signals being consistently out of phase by a same degree and uniformly offset with respect to one another to collectively represent incremental movement of the object; and at least one magnet having a north pole and a south pole each having a pole face, wherein at least one of said plurality of magnetic sensing devices includes at least one magnetic flux sensing element aligned with one of said pole faces of said at least one magnet.

18. The system of claim 17, wherein each of said plurality of magnetic sensing devices includes at least one magnetic flux sensing element aligned with said one of said pole faces of said at least one magnet.

19. The system of claim 18, wherein said at least one of said magnetic flux sensing elements is a magnetoresistive element.

20. The system of claim 19, wherein each of said plurality of magnetic sensing devices includes a pair of said magnetoresistive elements connected in series to define a half-bridge magnetoresistive sensing device.

21. The system of claim 17, wherein each of said plurality of magnetic sensing devices includes at least one magnetic flux sensing element aligned with one of said pole faces of separate ones of said at least one magnet.

22. The system of claim 17, wherein said plurality of magnetic sensing devices are magnetoresistive sensing devices.

23. The system of claim 22, wherein each of said magnetoresistive sensing devices is a half-bridge magnetoresistive sensing device including first and second magnetoresistive elements connected in series.

24. The system of claim 17, wherein said digital signals are consistently out of phase by ninety-degrees with respect to one another.

25. The system of claim 17, wherein said digital signals are consistently out of phase by sixty-degrees with respect to one another.

26. The system of claim 17, wherein said first and second digital signals are consistently and uniformly out of phase by ninety-degrees with respect to one another.

* * * * *